US011087680B2

(12) United States Patent
Tsuboi et al.

(10) Patent No.: US 11,087,680 B2
(45) Date of Patent: Aug. 10, 2021

(54) DISPLAY DEVICE, IMAGE CAPTURING DEVICE, ILLUMINATION DEVICE, MOBILE BODY, AND ELECTRONIC APPARATUS

(71) Applicant: CANON KABUSHIKI KAISHA, Tokyo (JP)

(72) Inventors: Hiromasa Tsuboi, Tama (JP); Yasushi Matsuno, Fujisawa (JP); Takehiko Soda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 16/668,199

(22) Filed: Oct. 30, 2019

(65) Prior Publication Data

US 2020/0143741 A1 May 7, 2020

(30) Foreign Application Priority Data

Nov. 7, 2018 (JP) .............................. JP2018-209928
Oct. 9, 2019 (JP) .............................. JP2019-186265

(51) Int. Cl.
*G09G 3/3233* (2016.01)
*H04N 5/232* (2006.01)

(52) U.S. Cl.
CPC ....... *G09G 3/3233* (2013.01); *H04N 5/23293* (2013.01); *G09G 2300/0413* (2013.01); *G09G 2300/0852* (2013.01)

(58) Field of Classification Search
CPC .......................... G09G 3/3233; H04N 5/23293
USPC .......... 345/205; 315/169.3; 362/19; 714/726
See application file for complete search history.

(56) References Cited

U.S. PATENT DOCUMENTS

| | | | |
|---|---|---|---|
| 8,749,459 B2 | 6/2014 | Shin et al. | |
| 2007/0234152 A1* | 10/2007 | Kwon | G09G 3/2011 714/726 |
| 2008/0036386 A1* | 2/2008 | Shin | G09G 3/3225 315/169.3 |
| 2010/0024733 A1 | 2/2010 | Soda et al. | |
| 2015/0330606 A1* | 11/2015 | Zhao | G09F 9/33 362/19 |
| 2016/0217735 A1* | 7/2016 | Park | G09G 3/3233 |
| 2016/0365032 A1* | 12/2016 | Wu | G09G 3/3233 |
| 2018/0041123 A1* | 2/2018 | Matsushima | H02M 3/158 |
| 2018/0315357 A1* | 11/2018 | Nam | H01L 27/3223 |
| 2018/0342203 A1 | 11/2018 | Soda | |
| 2019/0355311 A1 | 11/2019 | Ota et al. | |

FOREIGN PATENT DOCUMENTS

JP 2008-033253 A 2/2008

* cited by examiner

*Primary Examiner* — Prabodh M Dharia
(74) *Attorney, Agent, or Firm* — Venable LLP

(57) ABSTRACT

A display device comprises a pixel area in which a plurality of pixels are arranged, and a dummy pixel area which is provided around the pixel area and in which a plurality of dummy pixels are arranged. Each of the pixel and the dummy pixel includes a light-emitting element including a first electrode and a second electrode, and a driving transistor. The first electrode of the light-emitting element is connected to the driving transistor in the pixel, and in the dummy pixel, the light-emitting element is not connected to the driving transistor, a first potential is supplied to the first electrode, a second potential is supplied to the second electrode, and the light-emitting element does not emit light at a potential difference between the first potential and the second potential.

19 Claims, 16 Drawing Sheets

F I G. 22A
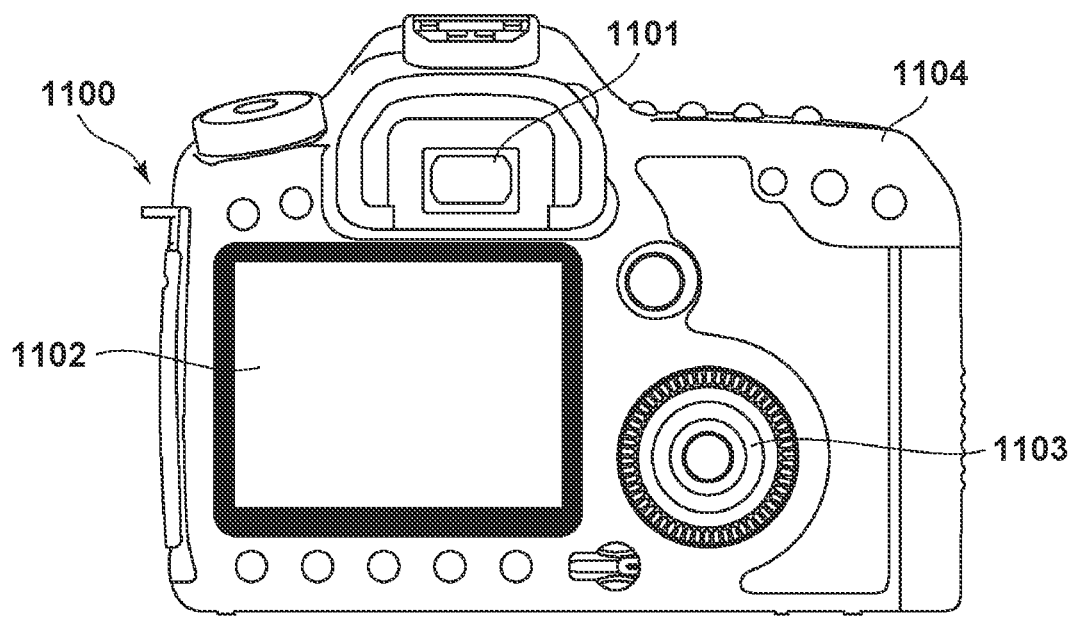
F I G. 22B
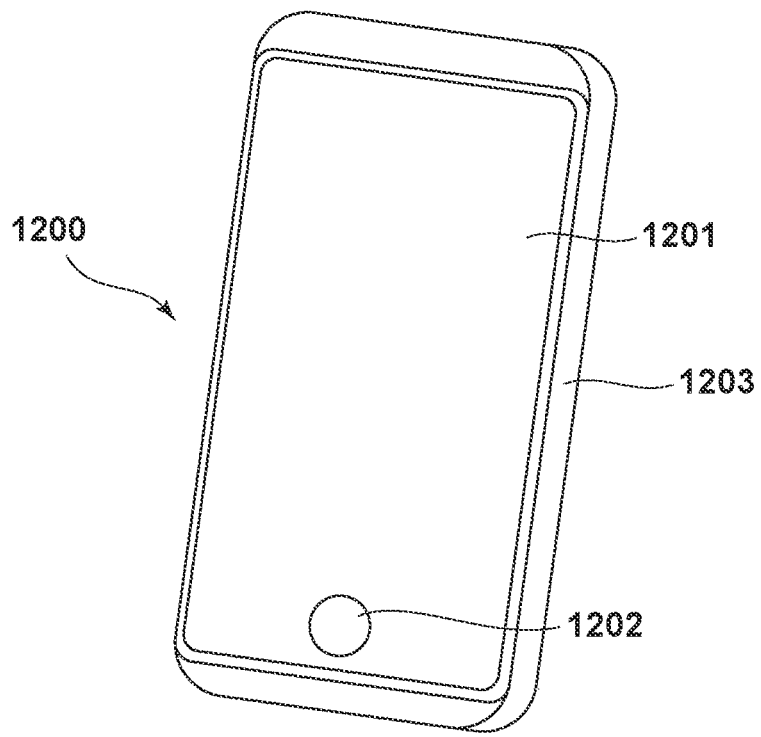

DISPLAY DEVICE, IMAGE CAPTURING DEVICE, ILLUMINATION DEVICE, MOBILE BODY, AND ELECTRONIC APPARATUS

BACKGROUND OF THE INVENTION

Field of the Invention

The present invention relates to a display device, an image capturing device, an illumination device, a mobile body, and an electronic apparatus.

Description of the Related Art

There is a display device provided with a light-emitting device using an organic EL. Japanese Patent Laid-Open No. 2008-33253 discloses a light-emitting display device in which a dummy pixel area formed by a plurality of dummy pixels is provided around a pixel area formed by a plurality of pixels, each of which includes a light-emitting element and a driving transistor for supplying a current to the light-emitting element. This literature discloses that the light-emitting element of the dummy pixel is controlled not to emit light by turning off the transistor of the dummy pixel.

SUMMARY OF THE INVENTION

In the dummy pixel, impact ionization may occur due to the electric field at the drain end of the driving transistor, and this may cause a significant increase in an off-leakage current between the source and the drain or a current flowing through the p-n junction between the drain and the well. As the increased current flows to the organic light-emitting element, the dummy pixel can emit light.

An aspect of the present invention relates to a display device in which light emission of the dummy pixel is suppressed. The present invention provides a display device comprising a pixel area in which a plurality of pixels are arranged, and a dummy pixel area which is provided around the pixel area and in which a plurality of dummy pixels are arranged, wherein each of the pixel and the dummy pixel includes a light-emitting element including a first electrode and a second electrode, and a driving transistor, wherein the first electrode of the light-emitting element is connected to the driving transistor in the pixel, and wherein in the dummy pixel, the light-emitting element is not connected to the driving transistor, a first potential is supplied to the first electrode, a second potential is supplied to the second electrode, and the light-emitting element does not emit light at a potential difference between the first potential and the second potential.

Further features of the present invention will become apparent from the following description of exemplary embodiments with reference to the attached drawings.

BRIEF DESCRIPTION OF THE DRAWINGS

FIG. 22A is a view schematically showing an example of an image capturing device;
FIG. 22B is a view schematically showing an example of an electronic apparatus.

DESCRIPTION OF THE EMBODIMENTS

A display device according to an embodiment of the present invention will be described below with reference to the accompanying drawings. Note that the embodiments to be explained below are merely examples of the present invention, and the numerical values, shapes, materials, components, arrangement and connection arrangement of the components, and the like described in the following embodiments do not intend to limit the present invention.

First Embodiment

Figure 1:
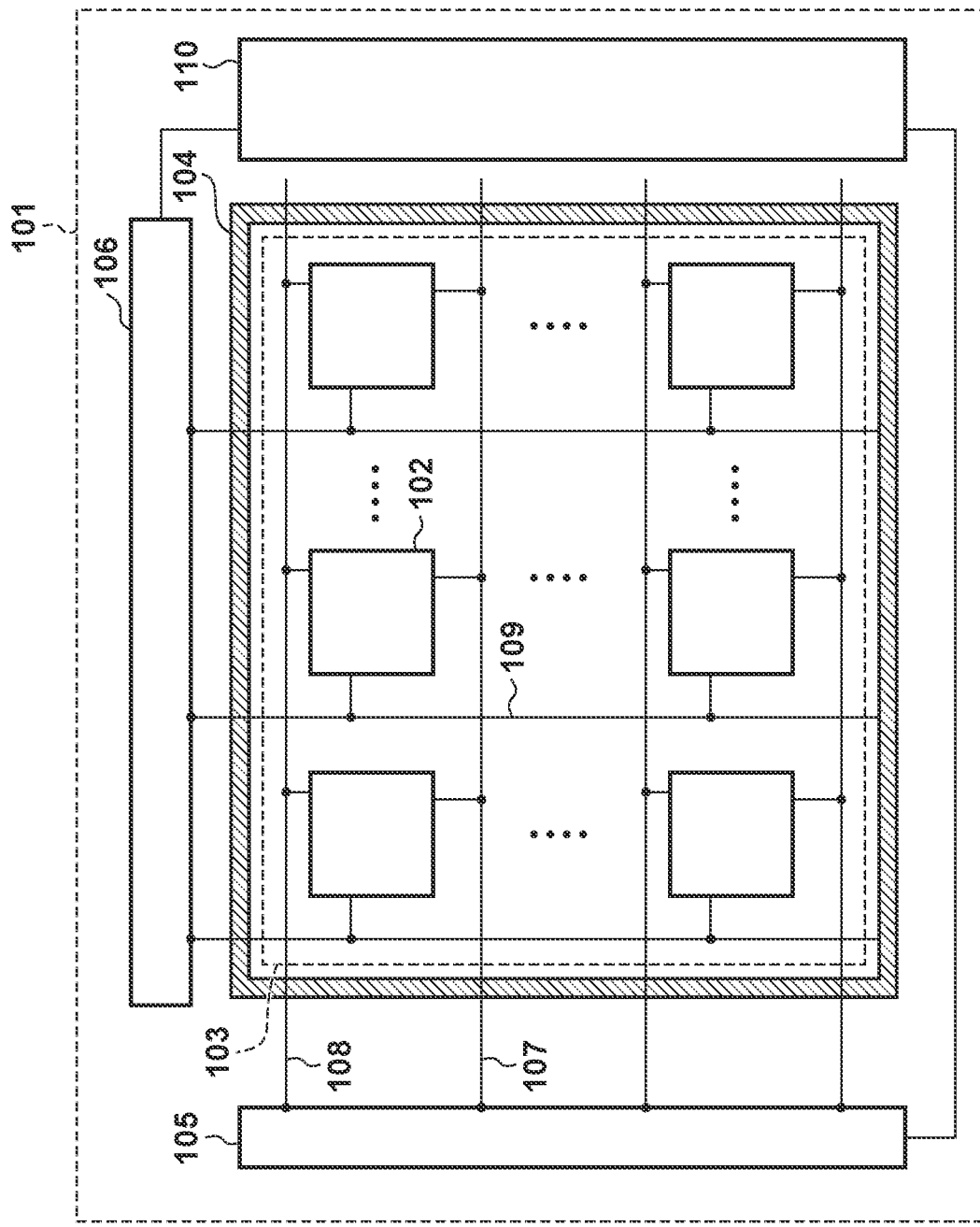
FIG. 1 is a view showing an example of a display device according to the first embodiment.

FIG. 1 is a view schematically showing a display device according to this embodiment. A case in which an organic light-emitting element is used as a light-emitting element for display, a driving transistor is connected to the anode of the organic light-emitting element, and all transistors are p-type transistors will be described below. However, the display device of the present invention is not limited to this. The polarity and conductivity type of the transistor may be reversed for all transistors. Further, the driving transistor may be a p-type transistor and other transistors may be n-type transistors. The potential to be supplied and the connection may be changed as appropriate in accordance with the conductivity type and polarity of the transistor. The similar components are denoted by the same reference numerals in the respective drawings, and a description thereof may be omitted.

An organic EL display device 101 will be described as an example of the display device with reference to FIGS. 1 to 3. The organic EL display device 101 includes a pixel area 103 formed by a plurality of pixels 102, a dummy pixel area 104 arranged around the pixel area 103, and a driving unit that drives the pixels. The pixel area 103 includes the plurality of pixels 102 two-dimensionally arranged in a matrix, and each pixel 102 includes an organic light-emitting element 201. The organic light-emitting element 201 includes an organic layer including a light-emitting layer between an anode and a cathode. The organic layer may appropriately include one or some of a hole injection layer, a hole transport layer, an electron injection layer, and an electron transport layer, in addition to the light-emitting layer.

The dummy pixel area 104 includes a plurality of dummy pixels 301, and is arranged around the pixel area 103. The driving unit is a circuit for driving the respective pixels 102. For example, the driving unit includes a vertical scanning circuit 105 and a signal output circuit 106. In the pixel area 103, a first scanning line 107 and a second scanning line 108 from the vertical scanning circuit 105 are arranged for each pixel row along a row direction. A signal line 109 from the signal output circuit 106 is arranged for each pixel column along a column direction. In the dummy pixel area 104, as in the pixel area 103, the first scanning line 107 and the second scanning line 108 are arranged along the row direction for some dummy pixels along the row direction. In addition, the signal line 109 is arranged along the column direction for some dummy pixel columns, as in the pixel area.

The first scanning line 107 and the second scanning line 108 for each row are connected to the output ends of the vertical scanning circuit 105 corresponding to each row. The signal line 109 for each column is connected to the output end of the signal output circuit 106 corresponding to each column. The signal output circuit 106 appropriately selects and outputs a luminance signal having a voltage corresponding to the luminance information of a video signal or a reference voltage signal having a reference voltage. The vertical scanning circuit 105 supplies a writing signal to the first scanning line 107 when writing a signal from the signal output circuit 106 to each pixel 102 in the pixel area 103. Further, a light emission control signal for controlling a current to the pixel 102 and driving the pixel 102 to emit light is supplied to the second scanning line 108. The driving unit is controlled by a control signal from a control unit 110. The control unit 110 is provided in the organic EL display device 101 in FIG. 1, but may be provided outside the organic EL display device 101. A signal corresponding to a video signal may be provided to the signal output circuit 106.

An example of the circuit of the pixel 102 included in the organic light-emitting device will be described with reference to FIG. 2. As shown in FIG. 2, the pixel 102 includes the organic light-emitting element 201, a driving transistor 202, a writing transistor 203, a light emission control transistor 204, a first capacitive element 205, and a second capacitive element 206.

Here, the total number of the transistors and the capacitive elements and the combination of the conductivity types of the transistors are merely examples, and are not limited to this arrangement. Note that in the following description, when a transistor is connected between an element A and an element B, one of the source and the drain of the transistor is connected to one of the element A and the element B, and the other of the source and the drain of the transistor is connected to other of the element A and the element B.

Figure 2:
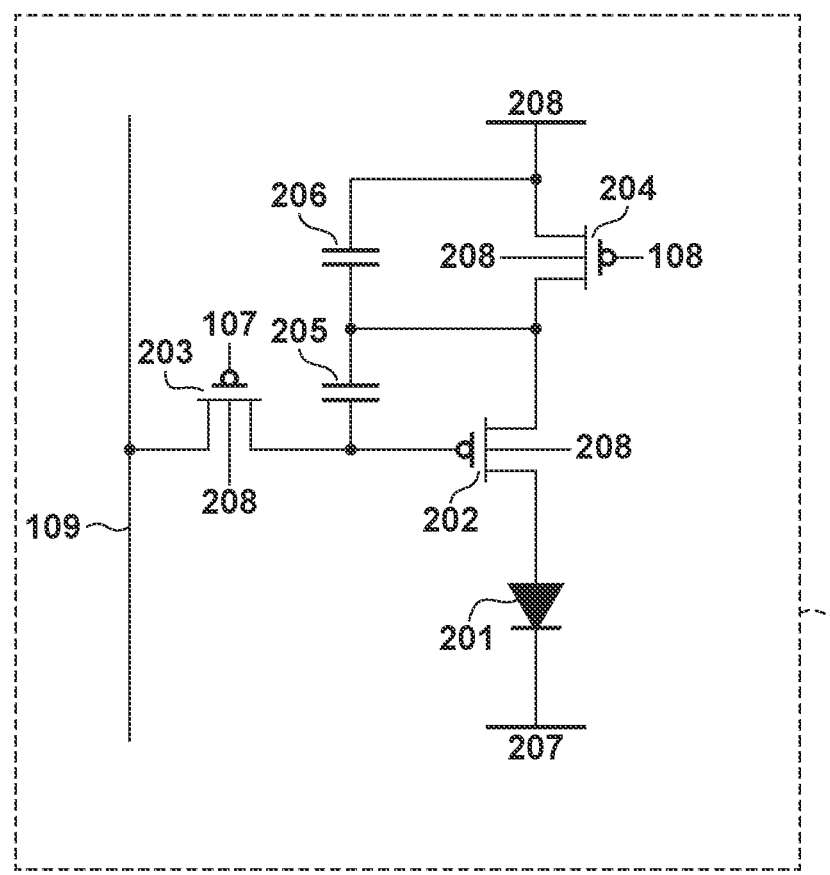
FIG. 2 is a view showing an example of the circuit of a pixel according to the first embodiment.

As a specific arrangement of the pixel, one of the source and the drain of the driving transistor 202 is connected to a first electrode of the organic light-emitting element 201 as shown in FIG. 2. In this example, the first electrode is an anode. A second electrode of the organic light-emitting element 201 is connected to a first power supply potential 207 (to be referred to as a Vss hereinafter) that provides a reference potential. In this example, the second electrode is a cathode. One of the source and the drain of the writing transistor 203 is connected to the gate of the driving transistor 202, and the other of the source and the drain of the writing transistor 203 is connected to the signal line 109. The gate of the writing transistor 203 is connected to the first scanning line 107. One of the source and the drain of the light emission control transistor 204 is connected to the other of the source and the drain of the driving transistor 202. The other of the light emission control transistor 204 is connected to a second power supply potential 208 (to be referred to as a Vdd hereinafter) that provides a predetermined potential to the circuit. The gate of the light emission control transistor 204 is connected to the second scanning line 108. Note that FIG. 2 shows an example in which the circuit is formed by p-type transistors. In FIG. 2, it is assumed that the drain of the driving transistor 202 is connected to the anode of the organic light-emitting element 201, and the drain of the light emission control transistor is connected to the source of the driving transistor. Further, the cathode of the organic light-emitting element 201 is connected to the Vss.

Here, in any transistor, the Vdd 208 is applied to the back gate. The first capacitive element 205 is connected between the gate and source of the driving transistor 202. The second capacitive element 206 is connected between the source of the driving transistor 202 and the Vdd 208.

The driving transistor 202 supplies a current from the Vdd 208 via the light emission control transistor 204 to the organic light-emitting element 201 to emit light. More specifically, the driving transistor 202 supplies a current corresponding to the signal voltage held in the first capacitive element 205 from the Vdd 208 to the organic light-emitting element 201. Thus, the organic light-emitting element 201 is current-driven to emit light.

The writing transistor 203 is turned on in response to a writing signal applied to the gate from the vertical scanning circuit 105 through the first scanning line 107. Accordingly, the writing transistor 203 samples the signal voltage of a video signal or a reference voltage corresponding to a luminance signal or a reference signal supplied from the signal output circuit 106 via the signal line 109, respectively, and writes the sampled voltage in the pixel 102. The written signal voltage or reference voltage is applied to the gate of the driving transistor 202 and held in the first capacitive element 205.

The light emission control transistor 204 is turned on or off in response to a light emission control signal applied to the gate from the vertical scanning circuit 105 via the second scanning line 108, so that it can control supply of a current from the Vdd 208 to the driving transistor 202. Thus, as described above, the organic light-emitting element 201 can be caused to emit light by the driving transistor 202. That is, the light emission control transistor 204 has a function as a transistor that controls light emission/non-light emission of the organic light-emitting element 201.

In this manner, a period during which the organic light-emitting element 201 is in a non-light emission state (non-light emission period) is provided by the switching operation of the light emission control transistor 204, so that the ratio of the light emission period and the non-light emission period of the organic light-emitting element 201 can be controlled (so-called duty control). With this duty control, afterimages associated with the light emission of the pixels 102 over one frame period can be reduced, and in particular, the quality of a moving image can be further improved.

When the organic EL (Organic Electroluminescent) element as the organic light-emitting element 201 emits light, the organic EL display device 101 changes the amount of a current flowing to the driving transistor 202 in accordance with the luminance of the video signal. To do this, the capacitance between the first electrode and the second electrode of the organic light-emitting element 201 is charged to a predetermined potential so that a current corresponding to the potential difference flows. Thus, the organic light-emitting element 201 emits light with predetermined luminance.

Figure 3:
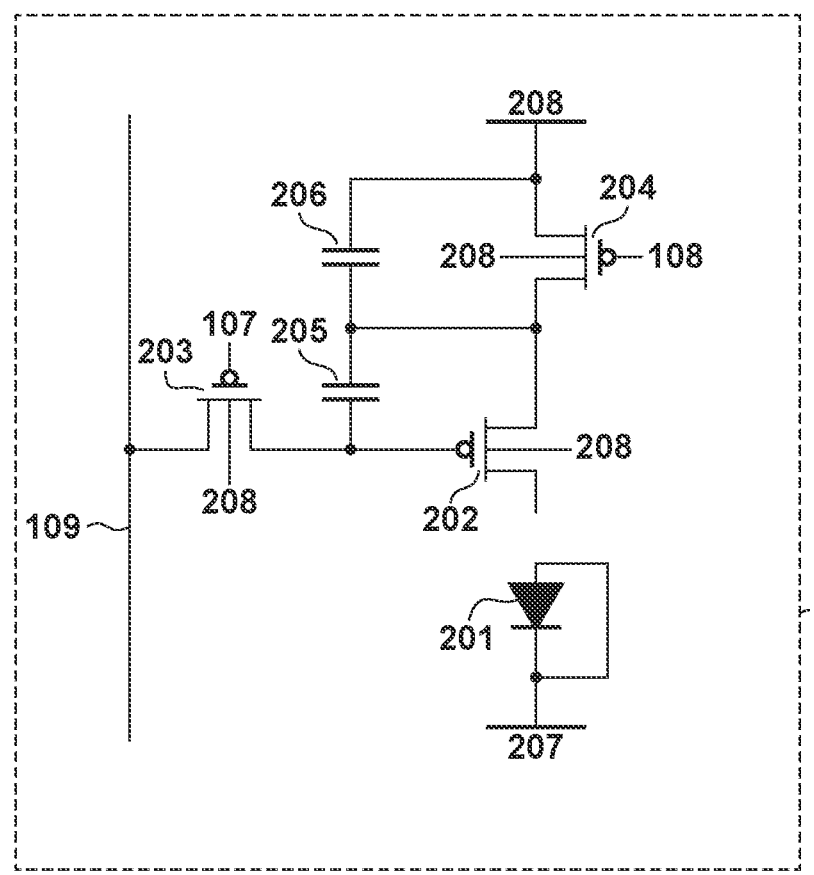
FIG. 3 is a view showing an example of the circuit of a dummy pixel according to the first embodiment.

FIG. 3 is a view showing an example of the circuit of the dummy pixel 301 arranged in the dummy pixel area 104. Similar to the pixel 102, the dummy pixel 301 includes the driving transistor 202, the writing transistor 203, the light emission control transistor 204, and the organic light-emitting element 201. The Vdd 208 is applied to the back gate of each of the driving transistor 202, the writing transistor 203, and the light emission control transistor 204. With this arrangement, an off-leakage current between the source and the drain of the driving transistor 202 or a current flowing through the p-n junction between the drain and the well are reduced to flow into the organic light-emitting element 201, so that the light emission of the dummy pixel 301 can be suppressed. Further, unlike the pixel 102, the first electrode of the organic light-emitting element 201 is not connected to the drain of the driving transistor 202, but the first electrode is connected to the second electrode of the organic light-emitting element 201. Thus, the light emission of the organic light-emitting element is further suppressed. The connection between the first electrode and the second electrode of the organic light-emitting element 201 may be a connection using a contact hole or a connection using a wiring. Here, the first electrode of the organic light-emitting element 201 is not necessarily connected to the second electrode. A potential difference at which the organic light-emitting element cannot emit light may be supplied between the first electrode and the second electrode of the organic light-emitting element 201. The first electrode may be connected to a fixed potential that does not exceed the light emission threshold of the organic light-emitting element 201. As to the potential supplied to the light-emitting element, it only needs to satisfy a relationship expressed by the anode voltage of the light-emitting element<the light emission threshold voltage+the cathode voltage of the light-emitting element.

Further, in the dummy pixel 301 forming the dummy pixel area 104 as shown in FIG. 3, the gate of the writing transistor 203 is connected to the first scanning line 107, and the gate of the light emission control transistor 204 is connected to the second scanning line 108. With this arrangement, the wiring of each scanning line can be connected to the pixel area 103 through the dummy pixel area 104 with the shortest distance. Therefore, the wiring length and resistance of each scanning line can be reduced, and the operation speed of the display device can be increased.

Modification of the First Embodiment

Modification 1-1

Next, Modification 1-1 of the arrangement of the dummy pixel according to the first embodiment will be described with reference to FIG. 4. In this modification, the drain of the driving transistor 202 is connected to the back gate. The arrangement different from that of the dummy pixel shown in FIG. 3 will be mainly described below.

Figure 4:
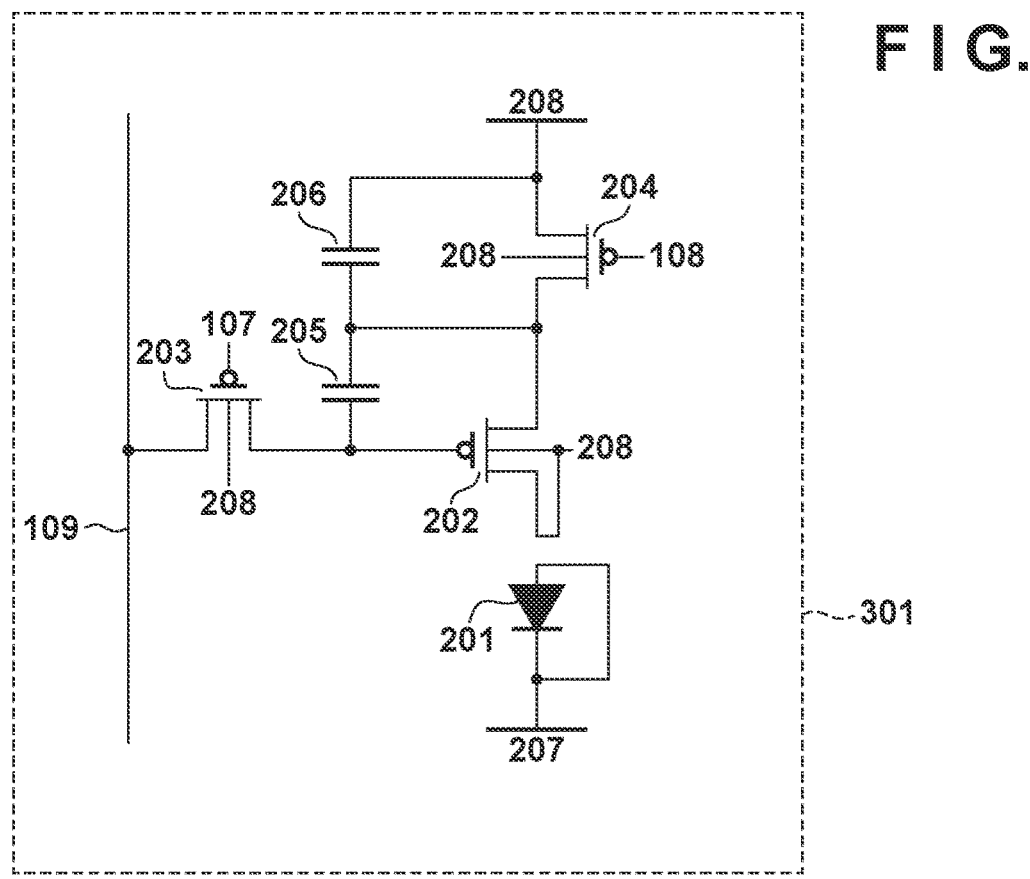
FIG. 4 is a view showing a modification of the circuit of the dummy pixel according to the first embodiment.

FIG. 4 is a circuit diagram of the dummy pixel 301 included in the organic EL display device according to this modification. In the pixel 102, the drain of the driving transistor 202 is connected to the organic light-emitting element 201. However, in the dummy pixel, the drain of the driving transistor 202 is connected to the back gate as shown in FIG. 4. The drain of the driving transistor 202 of the dummy pixel 301 is not connected to the organic light-emitting element 201. Since the Vdd 208 is applied to the back gate, the Vdd 208 is also applied to the drain of the driving transistor 202. Thus, the potential difference between the drain and the well becomes zero, so that the current flowing through the p-n junction can be suppressed. This suppresses the current flowing into the driving transistor 202, and suppresses the occurrence of a phenomenon such as impact ionization. As a result, it is possible to suppress the current flowing into the organic light-emitting element 201, and suppress the light emission of the organic light-emitting element 201. In addition, current consumption of the display device can be reduced.

Modification 1-2

Next, Modification 1-2 of the arrangement of the dummy pixel will be described with reference to FIG. 5. In this modification, the source of the driving transistor 202 is also connected to the back gate. The arrangement different from that in Modification 1-1 will be mainly described below.

Figure 5:
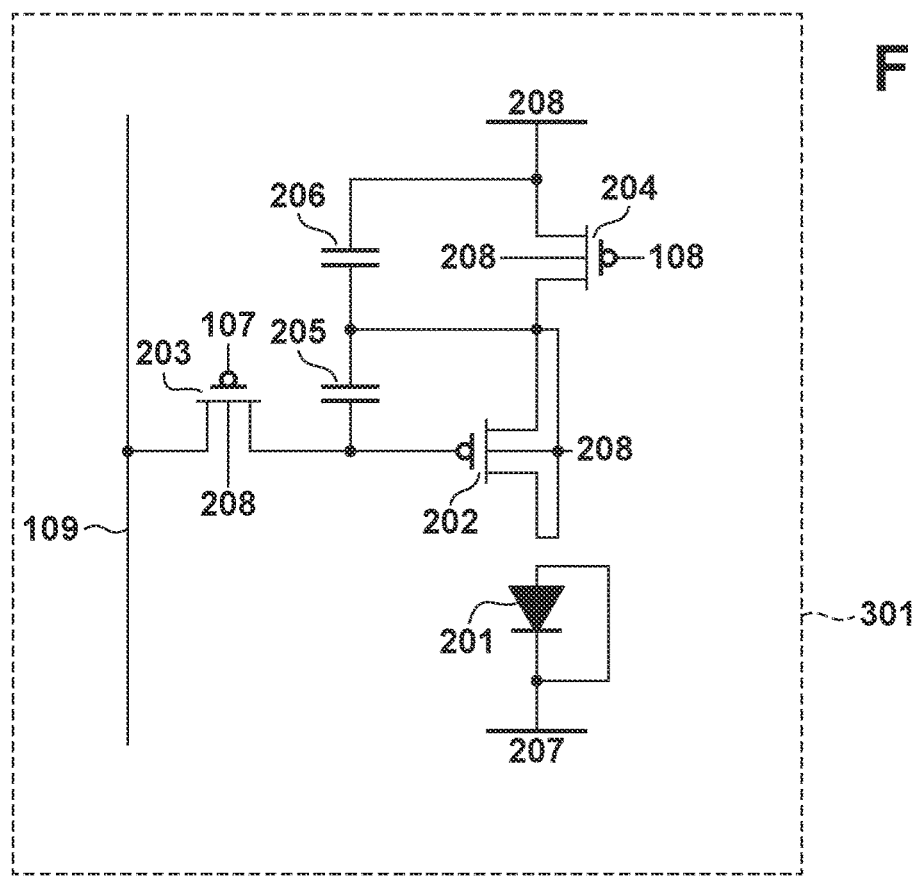
FIG. 5 is a view showing another modification of the circuit of the dummy pixel according to the first embodiment.

FIG. 5 is a circuit diagram of the dummy pixel 301 included in the organic EL display device according to this modification. As shown in FIG. 5, the source of the driving transistor 202 is connected to the back gate of the driving transistor 202. The Vdd 208 is applied to the back gate of the driving transistor 202. Accordingly, the Vdd 208 is applied to both the drain and the source of the driving transistor 202. Thus, the potential difference between the source and well of the driving transistor 202 and the potential difference between the drain and well become zero, so that the current flowing through the p-n junction can be suppressed. As a result, it is possible to suppress the current flowing into the organic light-emitting element 201, and suppress the light emission of the organic light-emitting element 201. In addition, current consumption of the display device can be reduced.

Modification 1-3

Next, Modification 1-3 of the arrangement of the dummy pixel will be described with reference to FIG. 6. In this modification, in addition to the arrangement of Modification 1-2, the drain of the writing transistor 203 is connected to the back gate. The arrangement different from that in Modification 1-2 will be mainly described below.

Figure 6:
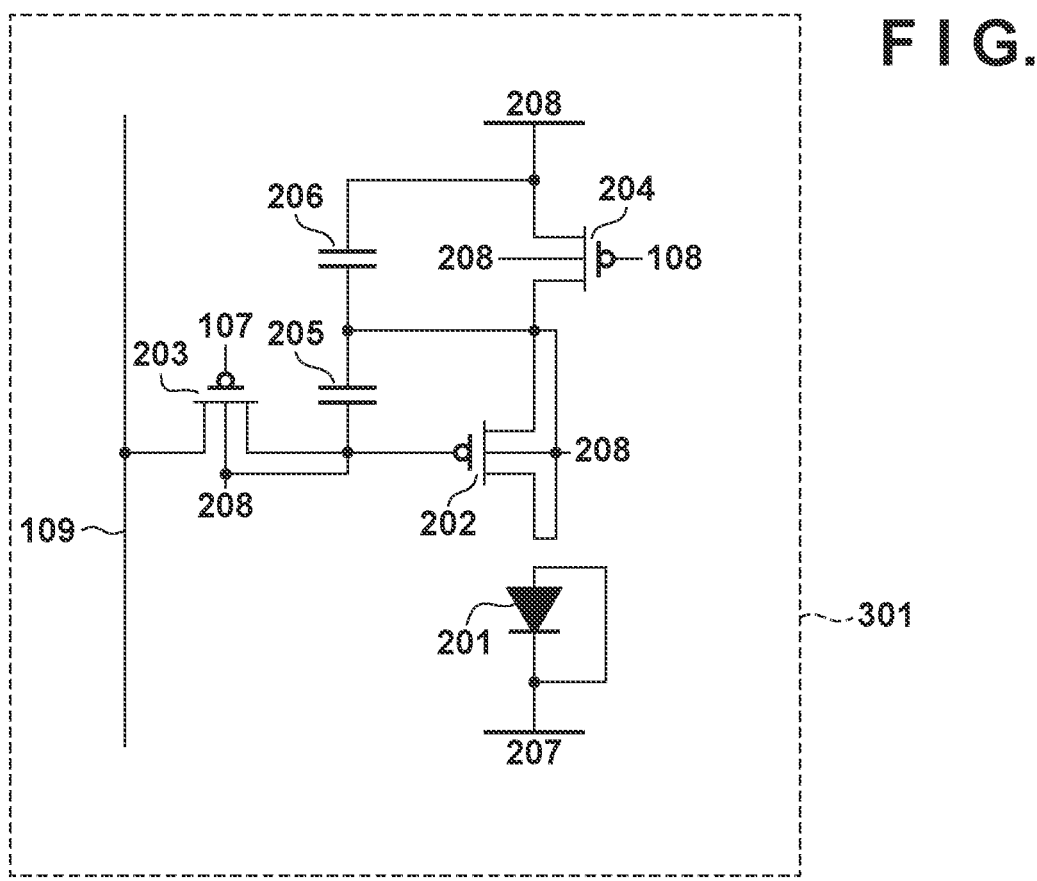
FIG. 6 is a view showing still another modification of the circuit of the dummy pixel according to the first embodiment.

FIG. 6 is a circuit diagram of the dummy pixel 301 included in the organic EL display device according to this modification. As shown in FIG. 6, the drain of the writing transistor 203 is connected to the back gate in this modification. Since the Vdd 208 is applied to the back gate, the Vdd 208 is also applied to the drain of the writing transistor 203. Thus, the potential difference between the drain and well of the writing transistor also becomes zero, so that the current flowing through the p-n junction can be suppressed. As a result, it is possible to suppress the current flowing into the organic light-emitting element 201, and suppress the light emission of the organic light-emitting element 201. In addition, current consumption of the display device can be reduced.

Modification 1-4

Next, Modification 1-4 of the arrangement of the dummy pixel will be described with reference to FIG. 7. In this modification, the source of the writing transistor 203 is also connected to the back gate. The arrangement different from that in Modification 1-3 will be mainly described below.

Figure 7:
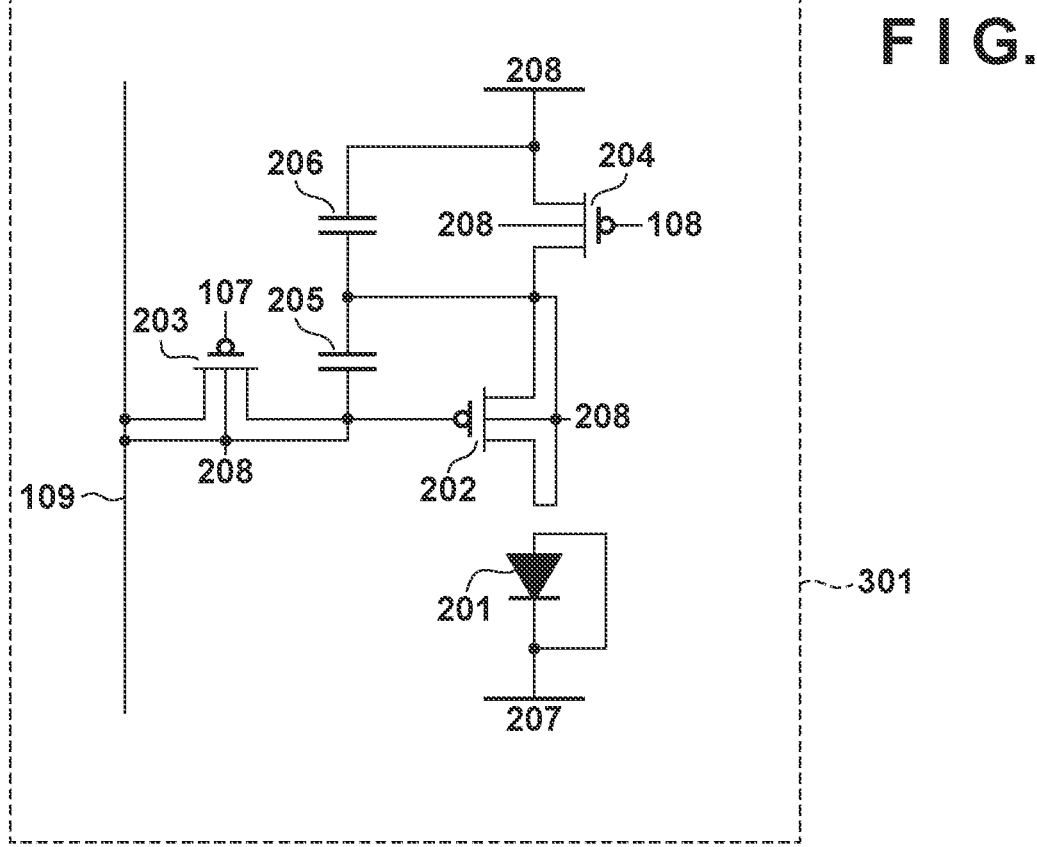
FIG. 7 is a view showing still another modification of the circuit of the dummy pixel according to the first embodiment.

FIG. 7 is a circuit diagram of the dummy pixel 301 included in the organic EL display device according to this modification. As shown in FIG. 7, the source of the writing transistor 203 is also connected to the back gate. Since the Vdd 208 is applied to the back gate, the Vdd 208 is applied to both the drain and the source of the writing transistor 203. Thus, the potential difference between the source and well of the writing transistor also becomes zero, so that the current flowing through the p-n junction can be suppressed. As a result, it is possible to suppress the current flowing into the organic light-emitting element 201, and suppress the light emission of the organic light-emitting element 201. In addition, current consumption of the display device can be reduced. FIG. 7 shows an example in which the source and the drain of the driving transistor 202 are connected to the back gate, and the source and the drain of the writing transistor 203 are connected to the back gate. However, at least one of the source and the drain of the driving transistor 202 or at least one of the source and the drain of the writing transistor 203 is required to be connected to the back gate. Note that in the dummy pixel sharing the signal line 109 with the pixel in the pixel area, the back gate of the writing transistor 203 may not be connected to the signal line 109.

Second Embodiment

Next, the second embodiment will be described with reference to FIGS. 8 to 10. In this embodiment, there is provided a reset transistor 901 for applying a Vss 207 to a first electrode of an organic light-emitting element 201 of a pixel 102. The arrangement different from that in the first embodiment will be mainly described below.

Figure 8:
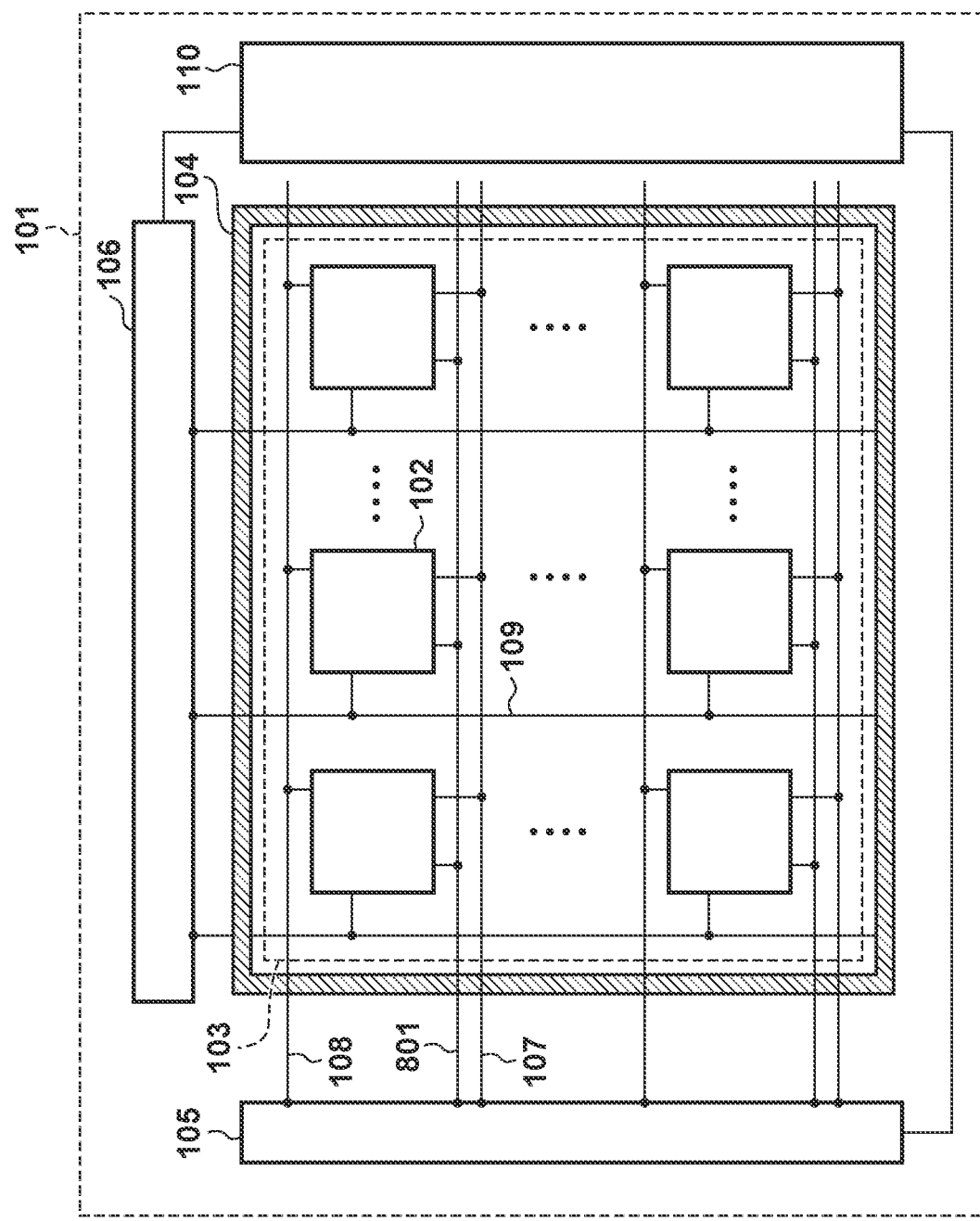
FIG. 8 is a view showing an example of a display device according to the second embodiment.

FIG. 8 is a view schematically showing an organic EL display device 101 according to this embodiment. As shown in FIG. 8, the difference from the first embodiment is that a third scanning line 801 is wired for each pixel row in a pixel area 103 along a row direction. Also in a dummy pixel area 104, the third scanning line 801 is wired to some of dummy pixels 301 in the dummy pixel area 104 along the row direction. The third scanning line 801 is connected to the output end of the vertical scanning circuit 105 corresponding to each row, and supplies a reset signal to each pixel 102.

Figure 9:
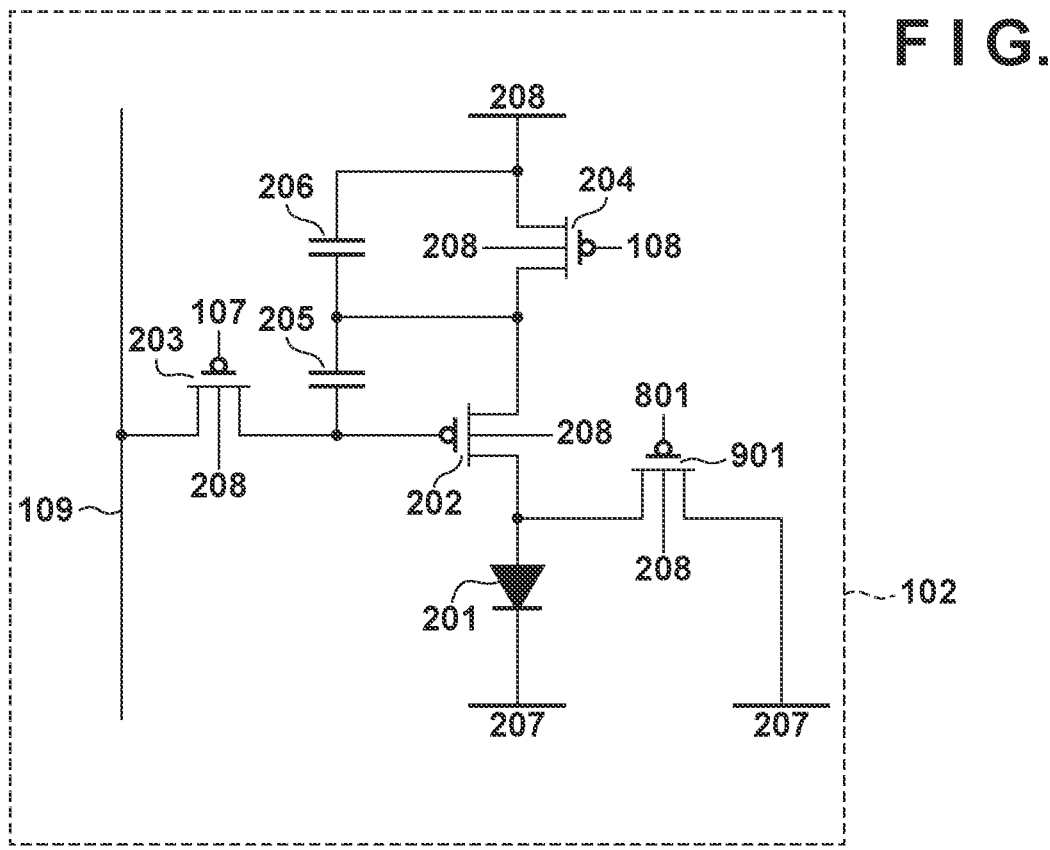
FIG. 9 is a view showing an example of the circuit of a pixel according to the second embodiment.

FIG. 9 is a view showing the circuit of an example of the pixel 102 included in the organic EL display device shown in FIG. 8. As shown in FIG. 9, one of the source and the drain of the reset transistor 901 is connected to one of the source and the drain of a driving transistor 202. The other of the source and the drain of the reset transistor 901 is connected to the Vss 207. The gate of the reset transistor 901 is connected to the third scanning line 801. In a non-light emission period, turn-on of the reset transistor 901 (that is, a reset operation) connects the first electrode of the organic light-emitting element 201 to the Vss 207, so that the organic light-emitting element 201 can be set in a non-light emission state. With this arrangement, a high-contrast light-emitting device can be realized. Note that FIG. 9 shows an example in which the circuit is formed by p-type transistors. In FIG. 9, it is assumed that the source of the reset transistor 901 is connected to the drain of the driving transistor 202. The back gate of each of the driving transistor 202, a writing transistor 203, a light emission control transistor 204, and the reset transistor 901 is connected to the Vdd.

Figure 10:
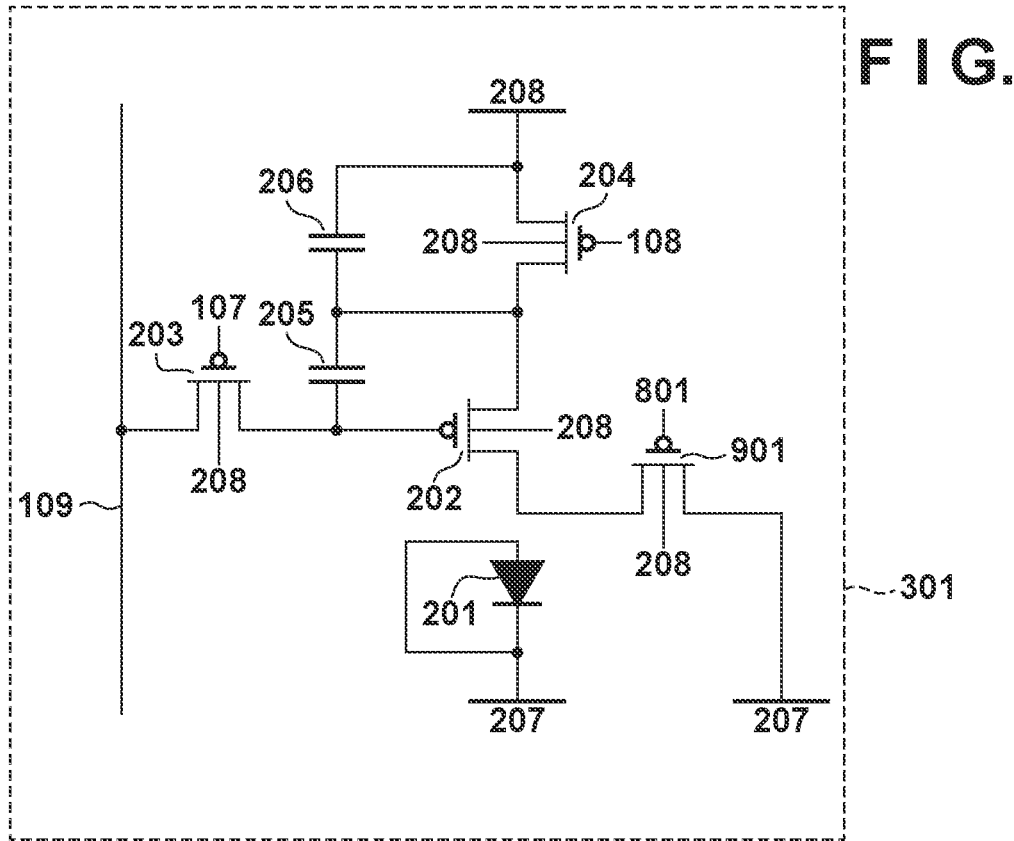
FIG. 10 is a view showing an example of the circuit of a dummy pixel according to the second embodiment.

FIG. 10 is a circuit diagram of an example of the dummy pixel 301. Similar to the pixel 102, the dummy pixel 301 includes the driving transistor 202, the writing transistor 203, the light emission control transistor 204, the reset transistor 901, and the organic light-emitting element 201. A Vdd 208 is applied to the back gate of each of the driving transistor 202, the writing transistor 203, the light emission control transistor 204, and the reset transistor 901. As shown in FIG. 10, the first electrode of the organic light-emitting element 201 is not connected to the drain of the driving transistor 202, but the first electrode is connected to the second electrode. Also, the source of the reset transistor 901 is not connected to the organic light-emitting element 201. The source of the reset transistor 901 is connected to the drain of the driving transistor 202, and a reference potential is applied to the drain of the reset transistor 901. Instead of applying a reference voltage to the drain of the reset transistor 901, the reference voltage may be applied to the source. Thus, the drain of the driving transistor 202 can be connected to the Vss 207 during the non-light emission period. Here, the first electrode of the organic light-emitting element 201 is not necessarily connected to the second electrode. When a first potential is supplied to the first electrode and a second potential is supplied to the second electrode, the potential difference between the first potential and the second potential may be set to a potential difference at which the light emitting element cannot emit light. That is, the first electrode only needs to be connected to a fixed voltage that does not exceed the light emission threshold of the organic light-emitting element 201. That is, it only needs to satisfy a relationship expressed by the anode voltage of the light-emitting element<the light emission threshold voltage+the cathode voltage.

Further, as shown in FIG. 8, since the wiring of each scanning line can be connected to the pixel area 103 through the dummy pixel area 104 with the shortest distance, the wiring length and resistance of each scanning line can be reduced, and the operation speed of the display device can be increased.

Modification of Second Embodiment

Modification 2-1

Next, Modification 2-1 of the arrangement of the dummy pixel will be described with reference to FIG. 11. In this modification, the source of the reset transistor 901 is connected to the back gate. The arrangement different from that of the dummy pixel shown in FIG. 10 will be mainly described below.

Figure 11:
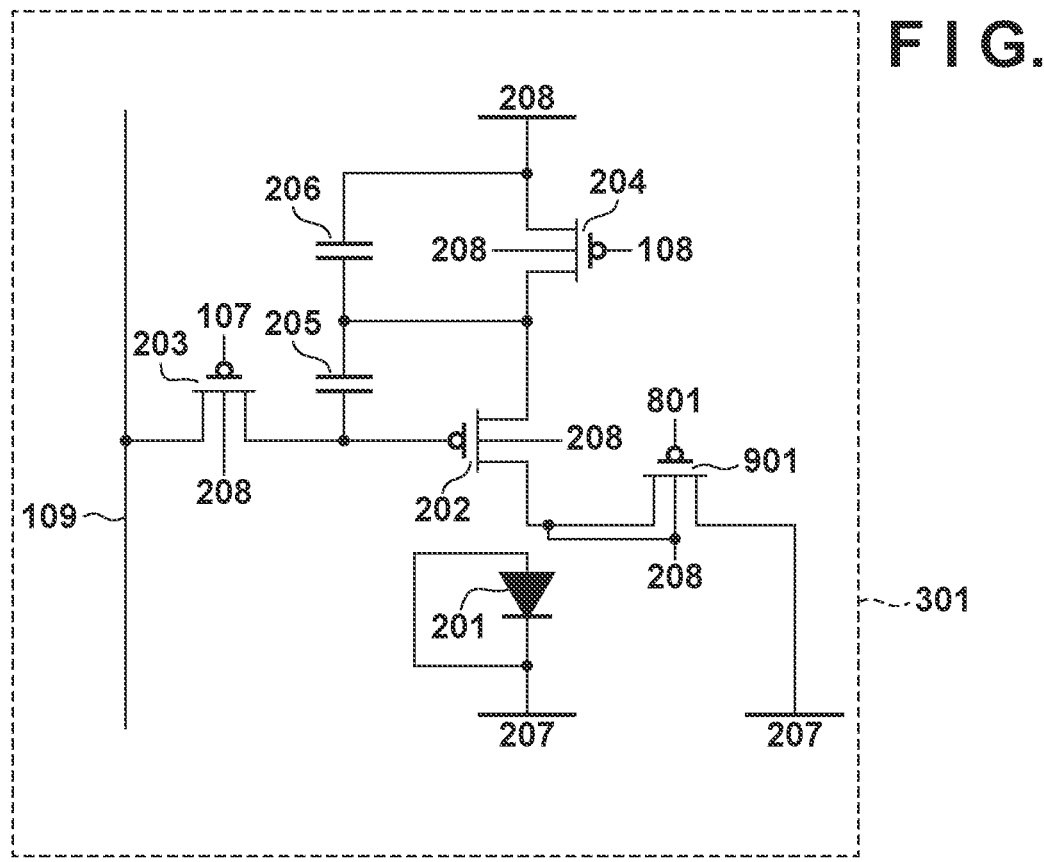
FIG. 11 is a view showing a modification of the circuit of the dummy pixel according to the second embodiment.

FIG. 11 is a circuit diagram of the dummy pixel 301 included in the organic EL display device according to this modification. As shown in FIG. 11, the source of the reset transistor 901 is connected to the back gate of the reset transistor 901. Since the Vdd 208 is connected to the back gate of the reset transistor 901, the Vdd 208 is also applied to the source of the reset transistor 901. Thus, the potential difference between the source and well of the reset transistor 901 becomes zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced.

Modification 2-2

Next, Modification 2-2 of the arrangement of the dummy pixel will be described with reference to FIG. 12. In this modification, the drain of the reset transistor 901 is also connected to the back gate. The arrangement different from that in Modification 2-1 will be mainly described below.

Figure 12:
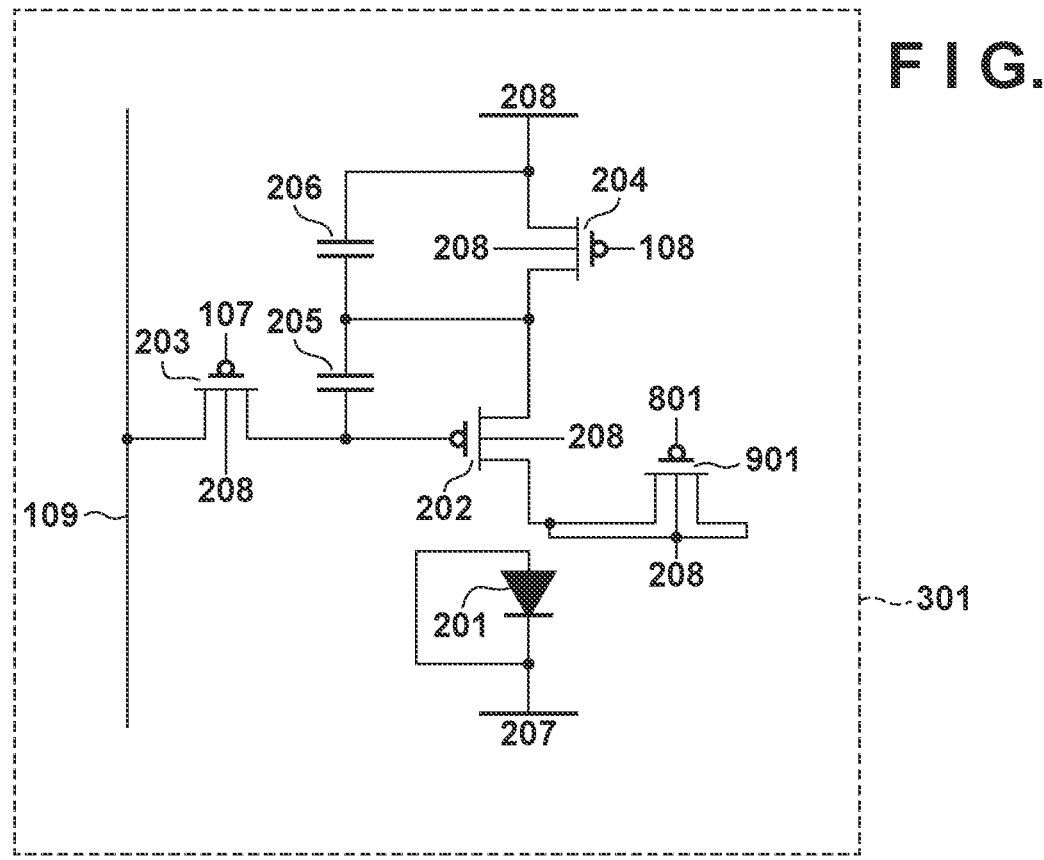
FIG. 12 is a view showing another modification of the circuit of the dummy pixel according to the second embodiment.

FIG. 12 is a circuit diagram of the dummy pixel 301 included in the organic EL display device according to this modification. As shown in FIG. 12, the drain of the reset transistor 901 is not connected to the Vss 207 but is connected to the back gate of the reset transistor 901. The Vdd 208 is applied to the back gate of the reset transistor 901. Accordingly, the Vdd 208 is applied to both the drain and the source of the reset transistor 901. Thus, the potential difference between the drain and well of the reset transistor 901 also becomes zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced.

Modification 2-3

Figure 13:
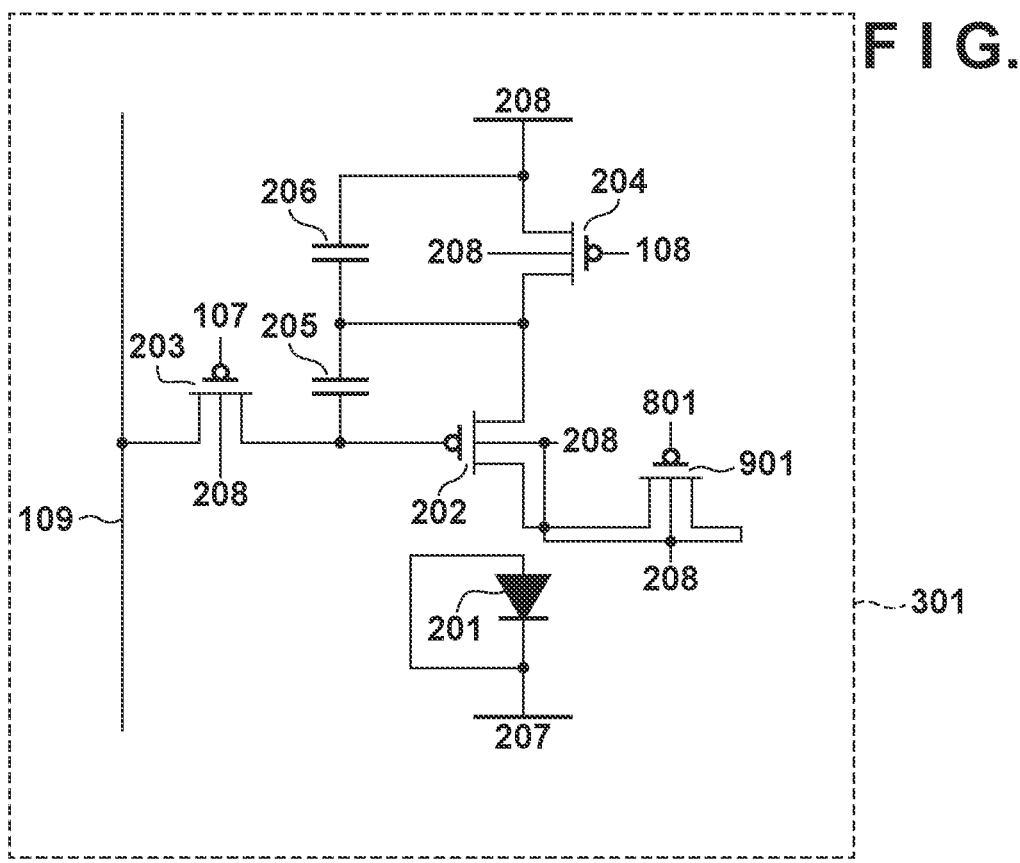
FIG. 13 is a view showing still another modification of the circuit of the dummy pixel according to the second embodiment.

Next, Modification 2-3 of the arrangement of the dummy pixel will be described with reference to FIG. 13. In this modification, the drain of the driving transistor 202 is also connected to the back gate. The arrangement different from that in Modification 2-2 will be mainly described below. FIG. 13 is a circuit diagram of the dummy pixel 301 included in the organic EL display device according to this modification. As shown in FIG. 13, the drain of the driving transistor 202 is connected to the back gate of the driving transistor 202. Since the Vdd 208 is applied to the back gate of the driving transistor, the Vdd 208 is also applied to the drain of the driving transistor 202. Thus, the potential difference between the drain and well of the driving transistor 202 becomes zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced.

Modification 2-4

Next, Modification 2-4 of the arrangement of the dummy pixel will be described with reference to FIG. 14. In this modification, the source of the driving transistor 202 is connected to the back gate. The arrangement different from that in Modification 2-3 will be mainly described below.

Figure 14:
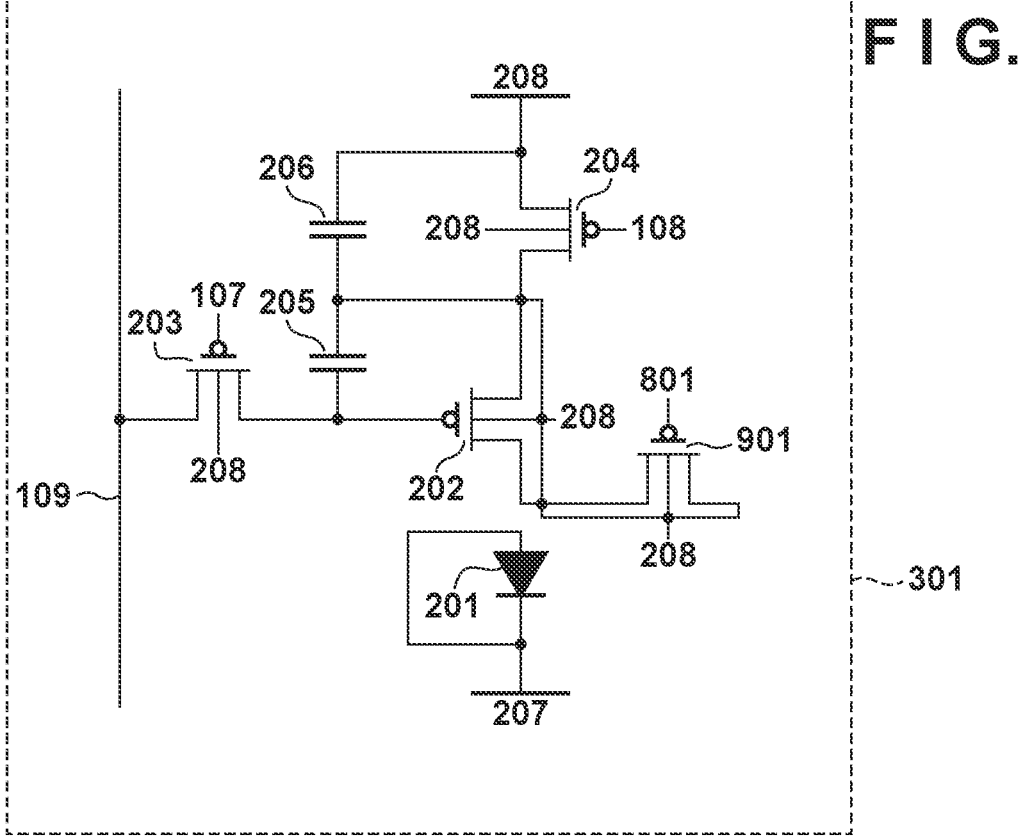
FIG. 14 is a view showing still another modification of the circuit of the dummy pixel according to the second embodiment.

FIG. 14 is a circuit diagram of the dummy pixel 301 included in the organic EL display device according to this modification. As shown in FIG. 14, the source of the driving transistor 202 is connected to the back gate of the driving transistor 202. Since the Vdd 208 is applied to the back gate of the driving transistor 202, the Vdd 208 is applied to both the source and the drain of the driving transistor 202. Thus, the potential difference between the source and well of the driving transistor 202 and the potential difference between the drain and well become zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced.

Modification 2-5

Next, Modification 2-5 of the dummy pixel 301 will be described with reference to FIG. 15. In this modification, the drain of the writing transistor 203 is connected to the back gate. The arrangement different from that in Modification 2-4 will be mainly described below.

Figure 15:
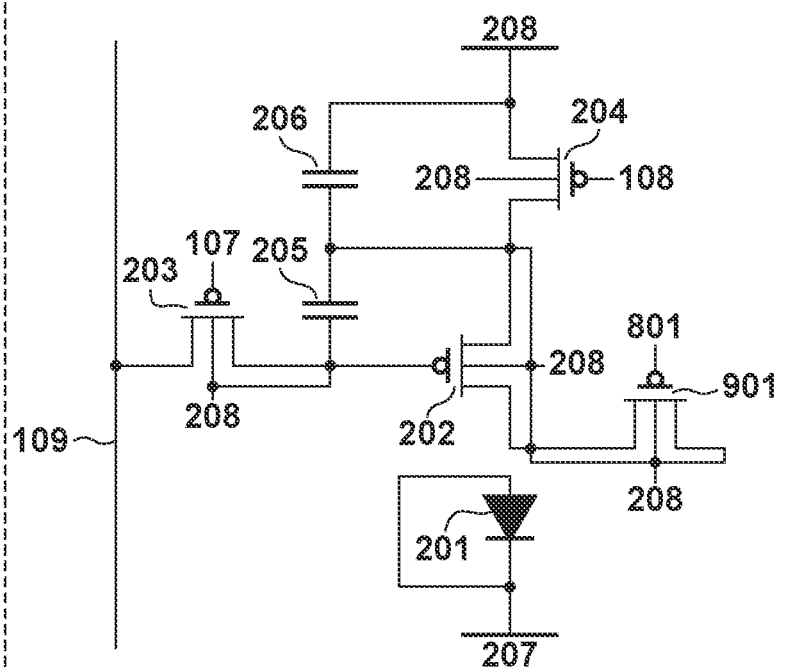
FIG. 15 is a view showing still another modification of the circuit of the dummy pixel according to the second embodiment.

FIG. 15 is a circuit diagram of the dummy pixel 301 included in the organic EL display device according to this modification. As shown in FIG. 15, the drain of the writing transistor 203 is connected to the back gate of the writing transistor 203. Since the Vdd 208 is applied to the back gate of the writing transistor 203, the Vdd 208 is also applied to the drain of the writing transistor 203. Thus, the potential difference between the drain and well of the writing transistor 203 also becomes zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced.

Modification 2-6

Next, Modification 2-6 of the arrangement of the dummy pixel will be described with reference to FIG. 16. In this modification, the source of the writing transistor 203 is also connected to the back gate. The arrangement different from that in Modification 2-5 will be mainly described below.

Figure 16:
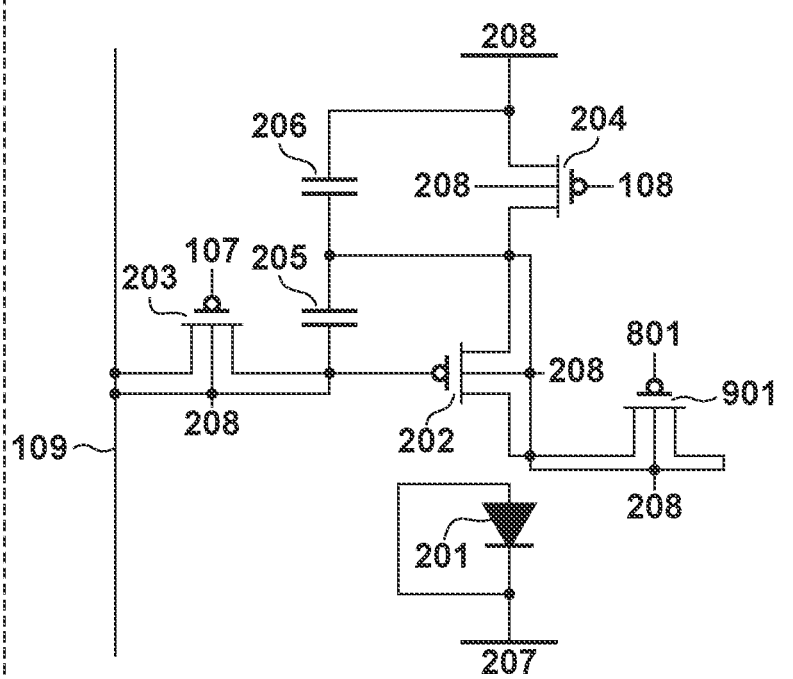
FIG. 16 is a view showing still another modification of the circuit of the dummy pixel according to the second embodiment.

FIG. 16 is a circuit diagram of the dummy pixel 301 included in the organic EL display device according to this modification. As shown in FIG. 16, the source of the writing transistor 203 is connected to the back gate of the writing transistor 203. Since the Vdd 208 is applied to the back gate of the writing transistor 203, the Vdd 208 is applied to both the source and the drain of the writing transistor 203. Thus, the potential difference between the source and well of the writing transistor 203 also becomes zero, so that the current flowing through the p-n junction can be suppressed. As a result, it is possible to suppress the current flowing into the organic light-emitting element 201, and suppress the light emission of the organic light-emitting element. In addition, current consumption of the display device can be reduced. Note that in the dummy pixel sharing the signal line 109 with the pixel in the pixel area, the back gate of the writing transistor 203 may not be connected to the signal line 109.

Third Embodiment

Next, the third embodiment will be described with reference to FIGS. 17 to 19. In this embodiment, a first dummy pixel area 1701 and a second dummy pixel area 1702 are provided around a pixel area 103. The arrangement different from that in the second embodiment will be mainly described below.

Figure 17:
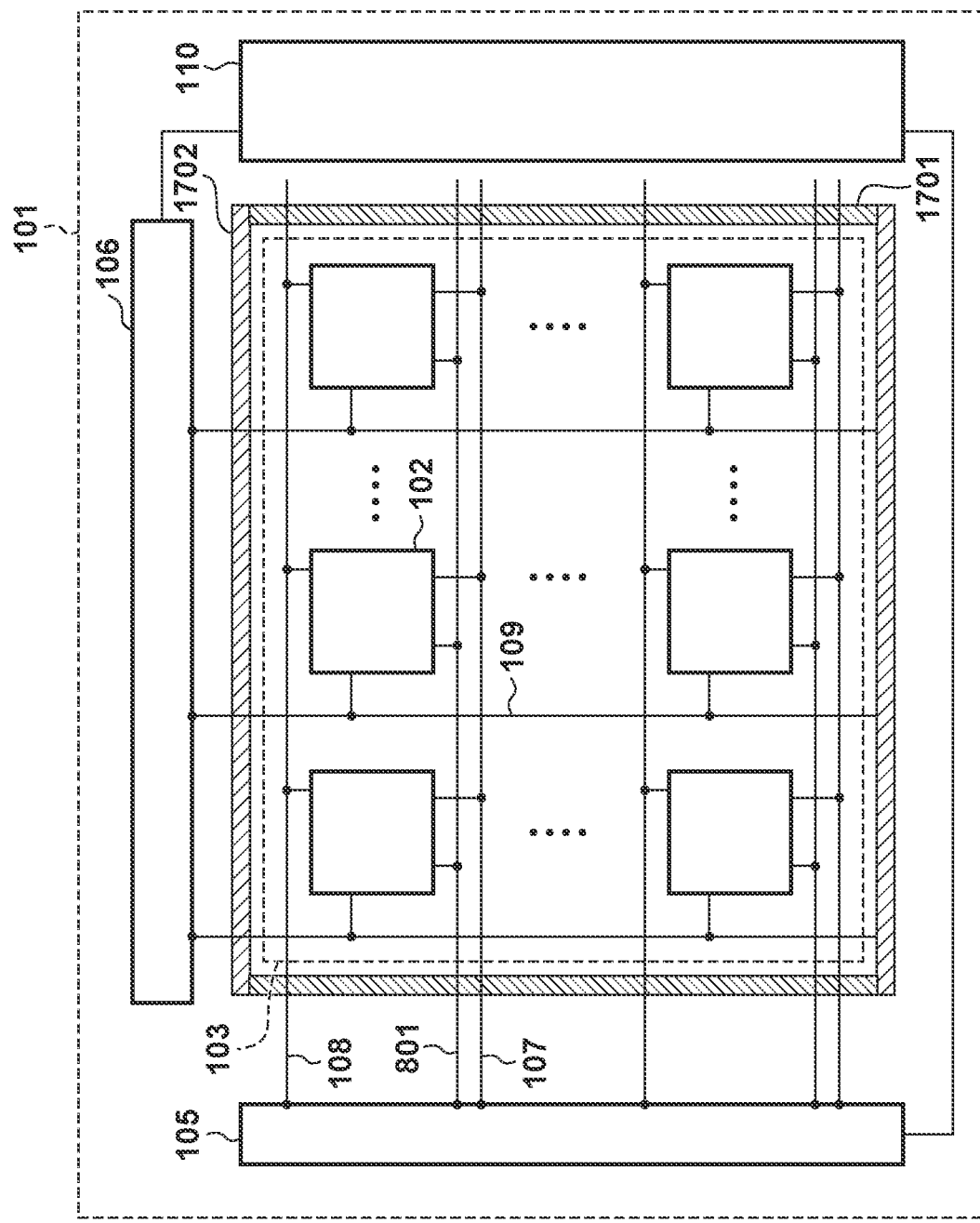
FIG. 17 is a view showing an example of a display device according to the third embodiment.

FIG. 17 is a view schematically showing an organic light-emitting device according to this embodiment. As shown in FIG. 17, the first dummy pixel area 1701 is arranged so as to cross first scanning lines 107, second scanning lines 108, and third scanning lines 801, and includes a plurality of dummy pixels 301 as shown in, for example, FIG. 16. The second dummy pixel area 1702 is arranged so as to cross signal lines 109, and includes a plurality of dummy pixels 1801 as shown in FIG. 18 or FIG. 19. In other words, the first scanning lines 107, the second scanning lines 108, and the third scanning lines 801 are arranged so as to pass through the first dummy pixel area 1701, and the signal lines 109 are arranged so as to pass through the second dummy pixel area.

Figure 18:
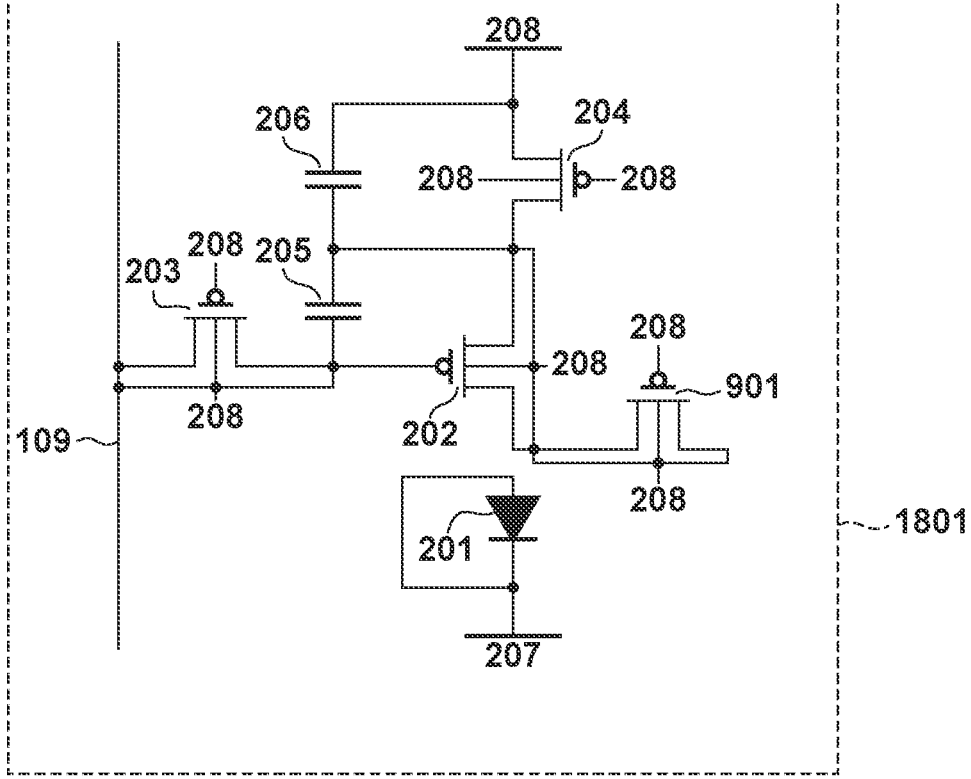
FIG. 18 is a view showing an example of the circuit of a dummy pixel according to the third embodiment.
Figure 19:
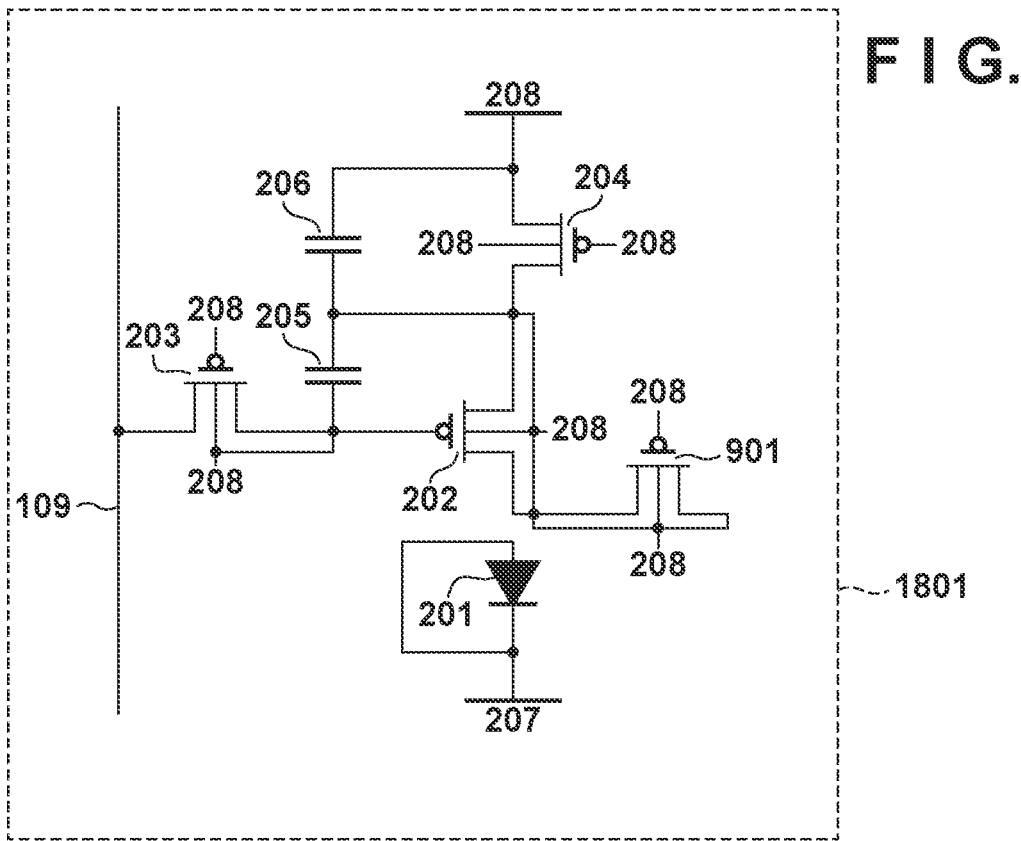
FIG. 19 is a view showing another example of the circuit of the dummy pixel according to the third embodiment.

Each of FIGS. 18 and 19 shows an example of the circuit of the dummy pixel 1801 arranged in the second dummy pixel area 1702 included in an organic EL display device 101 show in FIG. 17. Similar to a pixel 102, the dummy pixel 301 includes a driving transistor 202, a writing transistor 203, a light emission control transistor 204, a reset transistor 901, and an organic light-emitting element 201. As shown in FIG. 18, the gate of each of the writing transistor 203, the light emission control transistor 204, and the reset transistor 901 is connected to a Vdd 208 and in an OFF state. The organic light-emitting element 201 is not connected to the driving transistor 202, as shown in other circuit examples of the dummy pixel. In the examples shown FIGS. 18 and 19, the anode electrode of the organic light-emitting element 201 is connected to the cathode electrode. Thus, the current flowing between the source and the drain of each transistor can be suppressed. As a result, it is possible to suppress the current flowing into the organic light-emitting element 201, and suppress the light emission of the organic light-emitting element 201. In addition, current consumption of the display device can be reduced.

The difference between the dummy pixel shown in FIG. 18 and the dummy pixel shown in FIG. 19 is only the connection to the signal line 109. In the dummy pixel 1801 shown in FIG. 18, the back gate and drain of the writing transistor 203 are connected to the signal line 109. On the other hand, in the dummy pixel shown in FIG. 19, the back gate and drain of the writing transistor 203 are not connected to the signal line 109. When the back gate and drain of the writing transistor are connected to the signal line 109, the Vdd is supplied to the signal line 109 through the back gate. On the other hand, as shown in FIG. 19, when the back gate and drain of the writing transistor are not connected to the signal line 109, the influence on the signal to the pixels in the pixel area 103 can be greatly reduced. Therefore, the signal line 109 can be shared by the pixels and the dummy pixels.

Note that the arrangement of the dummy pixel 1801 is not limited to those shown in FIGS. 18 and 19. The arrangement obtained by connecting the gate of each of the writing transistor 203, the light emission control transistor 204, and the reset transistor 901 exemplified in the circuit of the other dummy pixel to the Vdd 208 may be used.

In the first dummy pixel area 1701, the dummy pixels 301 as shown in FIG. 16 may be arranged. In the first dummy pixel area 1701, the gates of the writing transistor 203, the light emission control transistor 204, and the reset transistor 901 are connected to the first scanning line 107, the second scanning line 108, and the third scanning line 801, respectively. With this arrangement, the wiring of each scanning line can be connected to the pixel area 103 through the first dummy pixel area 1701 with the shortest distance. Therefore, the wiring length and resistance of each scanning line can be reduced, and the operation speed of the display device can be increased. Note that the arrangement of the dummy pixel 301 is not limited to that shown in FIG. 16. The circuits of the dummy pixels described as other embodiments or modifications may be adopted in this embodiment. In the second dummy pixel area 1702, the dummy pixel sharing the signal line 109 with the pixel in the pixel area may be a dummy pixel 301 as shown in FIG. 15.

Fourth Embodiment

The display device according to each of the above-described embodiments can be used as a constituent member of the display device or illumination device of an apparatus while taking advantage of its light emission characteristics. In this embodiment, an application example of the display device will be described, but before that, the arrangement of an organic light-emitting element will be described in detail. The organic light-emitting element is provided by forming an anode, an organic compound layer, and a cathode on a substrate. A protective layer, a color filter, or the like may be provided on the cathode. If a color filter is provided, a planarizing layer may be provided between the color filter and the protective layer. The planarizing layer can be made of acrylic resin or the like.

Examples of the substrate include quartz, glass, a silicon wafer, a resin, a metal, and the like. A switching element such as a transistor or a wiring may further be provided on the substrate, and an insulating layer may be provided thereon. The insulating layer may be made of any material as long as a contact hole for ensuring electrical continuity between the anode and the wiring can be formed and insulation from the unconnected wiring can be ensured. For example, a resin such as polyimide, silicon oxide, silicon nitride, or the like can be used.

A pair of electrodes can be used as the electrodes of the organic light-emitting element. The pair of electrodes may be an anode and a cathode. When an electric field is applied in the direction in which the organic light-emitting element emits light, the electrode having a high potential is the anode, and the other is the cathode. It can also be said that the electrode that supplies holes to the light-emitting layer is the anode, and the electrode that supplies electrons is the cathode.

As the constituent material of the anode, a material having a work function as large as possible is used. For example, a metal such as gold, platinum, silver, copper, nickel, palladium, cobalt, selenium, vanadium, or tungsten, a mixture containing some of them, or an alloy obtained by combining some of them can be used. For example, a metal oxide such as tin oxide, zinc oxide, indium oxide, indium tin oxide (ITO), or zinc indium oxide can also be used. Furthermore, a conductive polymer such as polyaniline, polypyrrole, or polythiophene can also be used.

One of these electrode materials may be used singly, or two or more of them may be used in combination. The anode may be formed by a single layer or a plurality of layers.

When the electrode is used as a reflective electrode, for example, chromium, aluminum, silver, titanium, tungsten, molybdenum, an alloy thereof, a stacked layer thereof, or the like can be used. When the electrode is used as a transparent electrode, an oxide transparent conductive layer made of indium tin oxide (ITO), indium zinc oxide, or the like can be used, but the present invention is not limited thereto. A photolithography technique can be used to form the electrode.

On the other hand, as the constituent material of the cathode, a material having a small work function is used. Examples of the material include an alkali metal such as lithium, an alkaline earth metal such as calcium, a metal such as aluminum, titanium, manganese, silver, lead, or chromium, and a mixture containing some of them. Alternatively, an alloy obtained by combining these metals can also be used. For example, a magnesium-silver alloy, an aluminum-lithium alloy, an aluminum-magnesium alloy, a silver-copper alloy, a zinc-silver alloy, or the like can be used. A metal oxide such as indium tin oxide (ITO) can also be used. One of these electrode materials may be used singly, or two or more of them may be used in combination. The cathode may have a single-layer structure or a multi-layer structure. Among the above-described materials, silver is appropriate, and a silver alloy is more appropriate to suppress aggregation of silver. The ratio of the alloy is not limited as long as aggregation of silver can be suppressed. For example, the ratio may be 1:1.

The cathode may be a top emission element using an oxide conductive layer made of ITO or the like, or may be a bottom emission element using a reflective electrode made of aluminum (Al) or the like, and is not particularly limited. The method for forming the cathode is not particularly limited, but it is more appropriate to use direct current sputtering or alternating current sputtering because the good film coverage is provided and the resistance is easily lowered with these methods.

A protective layer may be provided on the cathode. For example, by adhering glass provided with a moisture absorbing agent on the cathode, permeation of water or the like into the organic compound layer can be suppressed and occurrence of display defects can be suppressed. Further, as another embodiment, a passivation film made of silicon nitride or the like may be provided on the cathode to suppress permeation of water or the like into the organic EL layer. For example, after forming the cathode and transferring it to another chamber without breaking the vacuum state, the protective layer may be formed by forming a silicon nitride film having a thickness of 2 μm by a CVD method. The protective layer may be provided using an atomic deposition method (ALD method) after forming a film using the CVD method.

A color filter may be provided on the protective layer. For example, a color filter considering the size of the organic light-emitting element may be provided on another substrate, and may be bonded to the substrate with the organic light-emitting element provided thereon. Alternatively, a color filter may be patterned on the protective layer described above using a photolithography technique. The color filter may be formed from a polymeric material.

A planarizing layer may be provided between the color filter and the protective layer. The planarizing layer may be formed from an organic compound. This may be a low-molecular material or a polymeric material, but the polymeric material is more appropriate.

The planarizing layers may be provided above and below the color filter, and the same or different materials may be used for them. More specifically, examples of the material include polyvinyl carbazole resin, polycarbonate resin, polyester resin, ABS resin, acrylic resin, polyimide resin, phenol resin, epoxy resin, silicone resin, urea resin, and the like.

A counter substrate may be provided on the planarizing layer. The counter substrate is called a counter substrate because it is provided at a position facing the above-described substrate. The constituent material of the counter substrate may be the same as that of the above-described substrate.

Organic compound layers (hole injection layer, hole transport layer, electron blocking layer, light-emitting layer, hole blocking layer, electron transport layer, electron injection layer, and the like) forming the organic light-emitting element according to an embodiment of the present invention are formed by the method described below.

The organic compound layer forming the organic light-emitting element according to an embodiment of the present invention can be formed by using a dry process such as a vacuum deposition method, an ionization vapor deposition method, sputtering, or a plasma method. Instead of the dry process, a wet process in which a layer is formed by dissolving a solute in an appropriate solvent and using a well-known coating method (for example, spin coating, dipping, casting method, LB method, inkjet method, or the like) may be used.

Here, when a layer is formed by a vacuum deposition method, a solution coating method, or the like, crystallization or the like hardly occurs and an excellent temporal stability is obtained. Furthermore, when a film is formed using a coating method, it is possible to form the film while combining with a suitable binder resin.

Examples of the binder resin include polyvinyl carbazole resin, polycarbonate resin, polyester resin, ABS resin, acrylic resin, polyimide resin, phenol resin, epoxy resin, silicone resin, urea resin, and the like. These are examples, and the binder resin is not limited thereto.

One of these binder resins may be used singly as a homopolymer or a copolymer, or two or more of them may be used in combination. Furthermore, additives, such as a well-known plasticizer, antioxidant, and an ultraviolet absorber, may also be used as needed.

Figure 20:
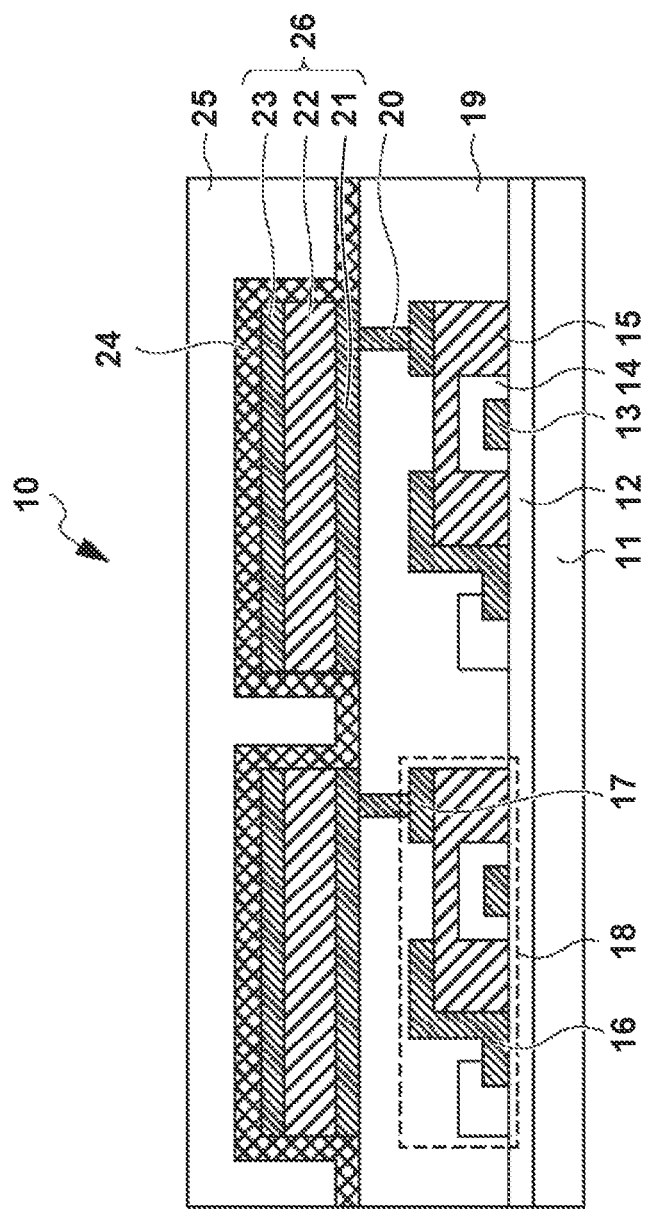
FIG. 20 is a sectional view schematically showing a display device using an organic light-emitting element.

Next, the display device according to this embodiment will be described with reference to the drawings. FIG. 20 is a schematic sectional view showing an example of the display device including an organic light-emitting element and a TFT element connected to the organic light-emitting element. The TFT element is an example of an active element.

A display device 10 shown in FIG. 20 includes a substrate 11 made of glass or the like, and a moisture-proof film 12 for protecting the TFT element or an organic compound layer on the substrate 11. FIG. 20 shows two pixels so that two TFT elements are shown on the substrate 11. However, FIG. 20 shows an example for explanation, and the number of pixels is not limited to this. Reference numeral 13 denotes a metal gate electrode. Reference numeral 14 denotes a gate insulating film, and reference numeral 15 denotes a semiconductor layer.

A TFT element 18 includes the semiconductor layer 15, a drain electrode 16, and a source electrode 17. An insulating film 19 is provided on the TFT element 18. An anode 21 forming the organic light-emitting element is connected to the source electrode 17 via a contact hole 20.

Note that the method of electrical connection between the electrodes (anode and cathode) included in the organic light-emitting element and the electrodes (source electrode and drain electrode) included in the TFT is not limited to that shown in FIG. 20. That is, it only needs that either the anode or the cathode is electrically connected to either the source electrode or the drain electrode of the TFT element.

The organic compound layer is illustrated as one layer in the display device 10 shown in FIG. 20, but an organic compound layer 22 may include a plurality of layers. A first protective layer 24 and a second protective layer 25 for suppressing deterioration of the organic light-emitting element are provided on a cathode 23.

In the display device 10 shown in FIG. 20, a transistor is used as a switching element, but a MIM element may be used as the switching element instead.

The transistor used in the display device 10 shown in FIG. 20 is not limited to a transistor using a single-crystal silicon wafer, but may be a thin-film transistor having an active layer on an insulating surface of a substrate. Examples of the active layer include single-crystal silicon, amorphous silicon, non-single-crystal silicon such as microcrystalline silicon, and a non-single-crystal oxide semiconductor such as indium zinc oxide and indium gallium zinc oxide. The thin-film transistor is also called a TFT element.

The transistor included in the display device 10 shown in FIG. 20 may be formed in a substrate such as an Si substrate. Here, being formed in a substrate means that a transistor is formed by processing the substrate itself such as an Si substrate. In other words, including a transistor in a substrate can be regarded as integrally forming the substrate and the transistor.

The light emission luminance of the organic light-emitting element according to this embodiment is controlled by the TFT which is an example of a switching element, and by providing a plurality of the organic light-emitting elements in a plane, an image can be displayed with the light emission luminance of the respective devices. Note that the switching element according to this embodiment is not limited to the TFT, but may be a transistor formed from low-temperature polysilicon or an active matrix driver formed on the substrate such as an Si substrate. The term "on the substrate" may mean "in the substrate". Whether to provide a transistor or a TFT in the substrate is selected based on the size of the display unit. For example, if the size is about 0.5 inch, it can be made to provide the organic light-emitting element on the Si substrate.

In addition, the present invention is applicable to the exposure light source of an electrophotographic image forming device, the backlight of a liquid crystal display device, a light-emitting device including a color filter in a white light source, and the like.

The display device may be an image information processing device that includes an image input unit for inputting image information from an area CCD, a linear CCD, a memory card, or the like, and an information processing unit for processing the input information, and displays the input image on a display unit.

In addition, a display unit included in an image capturing device or an inkjet printer may have a touch panel function. The driving type of the touch panel function may be an infrared type, a capacitance type, a resistive film type, or an electromagnetic induction type, and is not particularly limited. The display device may be used for the display unit of a multifunction printer.

Next, application examples of the display device of the present disclosure will be specifically described.

Figure 21:
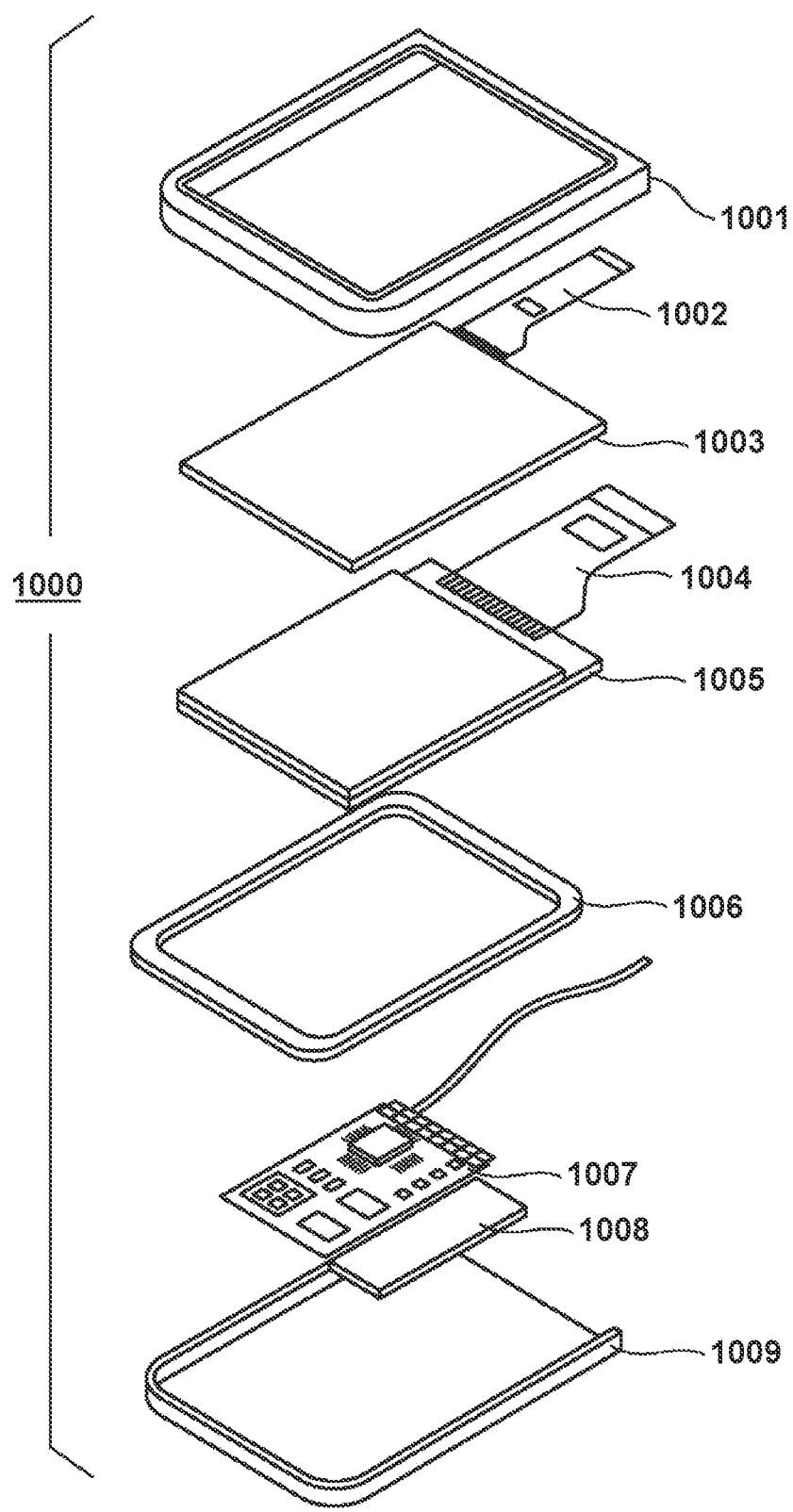
FIG. 21 is a view schematically showing an example of the display device.

FIG. 21 is a view schematically showing an example of the display device according to this embodiment. A display device 1000 may include, between an upper cover 1001 and a lower cover 1009, a touch panel 1003, a display panel 1005, a frame 1006, a circuit board 1007, and a battery 1008. The touch panel 1003 and the display panel 1005 are connected to flexible printed circuit FPCs 1002 and 1004, respectively. Transistors are arranged on the circuit board 1007. The battery 1008 may not be provided if the display device is not a portable device, or may be provided in another position even if the display device is a portable device.

The display device according to this embodiment may be used for the display unit of an image capturing device that includes an optical unit including a plurality of lenses and an image sensor that receives light passing through the optical unit. The image capturing device may include a display unit that displays information acquired by the image sensor. Alternatively, information may be acquired using the information acquired by the image sensor, and the display unit may display the information different from the information acquired by the image sensor. The display unit may be a display unit exposed to the outside of the image capturing device, or a display unit arranged in a viewfinder. The image capturing device may be a digital camera or a digital video camera.

FIG. 22A is a view schematically showing an example of an image capturing device according to this embodiment. An image capturing device 1100 may include a viewfinder 1101, a rear display 1102, an operation unit 1103, and a housing 1104. The viewfinder 1101 may include the display device according to this embodiment. In this case, the display device may display not only an image to be captured, but also environment information, an image capturing instruction, and the like. The environment information may include the intensity of ambient light, the direction of ambient light, the moving speed of an object, the possibility that the object is blocked by a shielding object, or the like.

Since the timing suitable for capturing an image is a short time, it is better to display the information as quickly as possible. Therefore, it is suitable to use the display device using the organic light-emitting element of the present invention. This is because the organic light-emitting element has a high response speed. The display device using the organic light-emitting element can be used more suitably than a liquid crystal display device in the devices that require a high display speed.

The image capturing device 1100 includes an optical unit (not shown). The optical unit includes a plurality of lenses and forms an image on an image sensor housed in the housing 1104. It is possible to adjust the focus by adjusting the relative positions of the plurality of lenses. This operation can be performed automatically.

The display device according to this embodiment may include a color filter having red, green, and blue colors. In the color filter, the red, green, and blue colors may be arranged in a delta arrangement.

The display device according to this embodiment may be used for the display unit of a mobile terminal. In this case, both a display function and an operation function may be provided. Examples of the mobile terminal include a mobile phone such as a smartphone, a tablet, and a head mounted display.

FIG. 22B is a view schematically showing an example of an electronic apparatus according to this embodiment. An electronic apparatus 1200 includes a display unit 1201, an operation unit 1202, and a housing 1203. The housing 1203 may include a circuit, a printed board including the circuit, a battery, and a communication unit. The operation unit 1202 may be a button or a touch panel type sensing unit. The operation unit may be a biometrics unit that recognizes a fingerprint and releases a lock or the like. An electronic apparatus including a communication unit can also be called a communication apparatus.

Figure 23A:
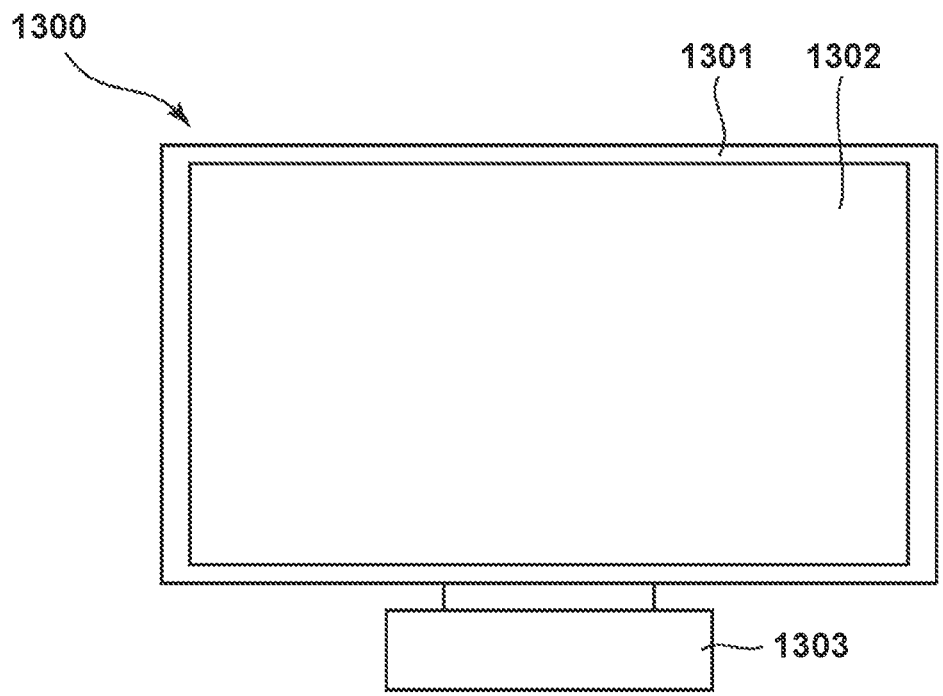
FIG. 23A is a view schematically showing an example of the display device.
Figure 23B:
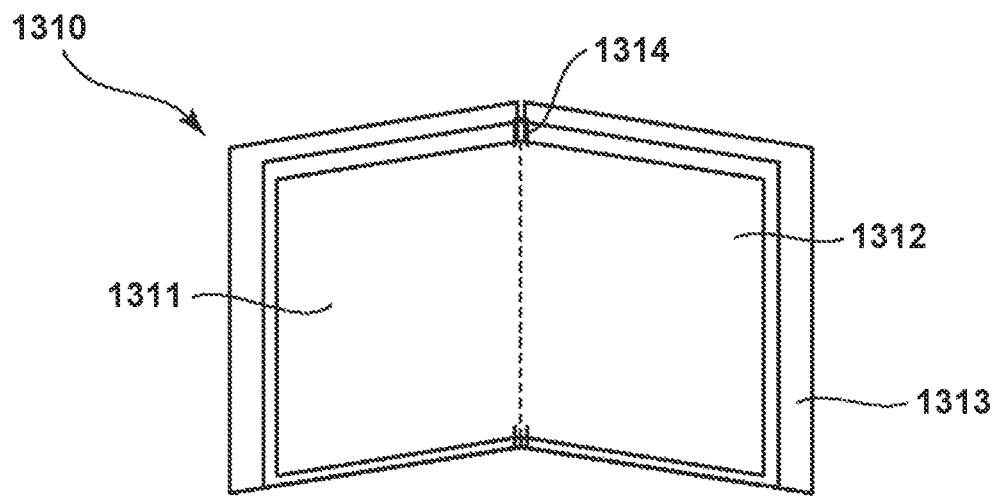
FIG. 23B is a view schematically showing an example of a foldable display device.

FIGS. 23A and 23B are views schematically showing examples of the display device according to this embodiment. FIG. 23A shows a display device such as a television monitor or a PC monitor. A display device 1300 includes a frame 1301 and a display unit 1302. The display device according to the present invention may be used for the display unit 1302.

The display device 1300 includes the frame 1301 and a base 1303 that supports the display unit 1302. The base 1303 is not limited to the form shown in FIG. 23A. The lower side of the frame 1301 may serve as the base.

The frame 1301 and the display unit 1302 may be bent. The curvature radius may be between 5,000 mm (inclusive) and 6,000 mm (inclusive).

FIG. 23B is a view schematically showing another example of the display device according to this embodiment. A display device 1310 shown in FIG. 23B is configured to be bendable, and is a so-called foldable display device. The display device 1310 includes a first display unit 1311, a second display unit 1312, a housing 1313, and a bending point 1314. Each of the first display unit 1311 and the second display unit 1312 may include the display device according to this embodiment. The first display unit 1311 and the second display unit 1312 may be one seamless display device. The first display unit 1311 and the second display unit 1312 can be divided at the bending point. The first display unit 1311 and the second display unit 1312 may display different images, or one image may be displayed with the first and second display units.

Figure 24A:
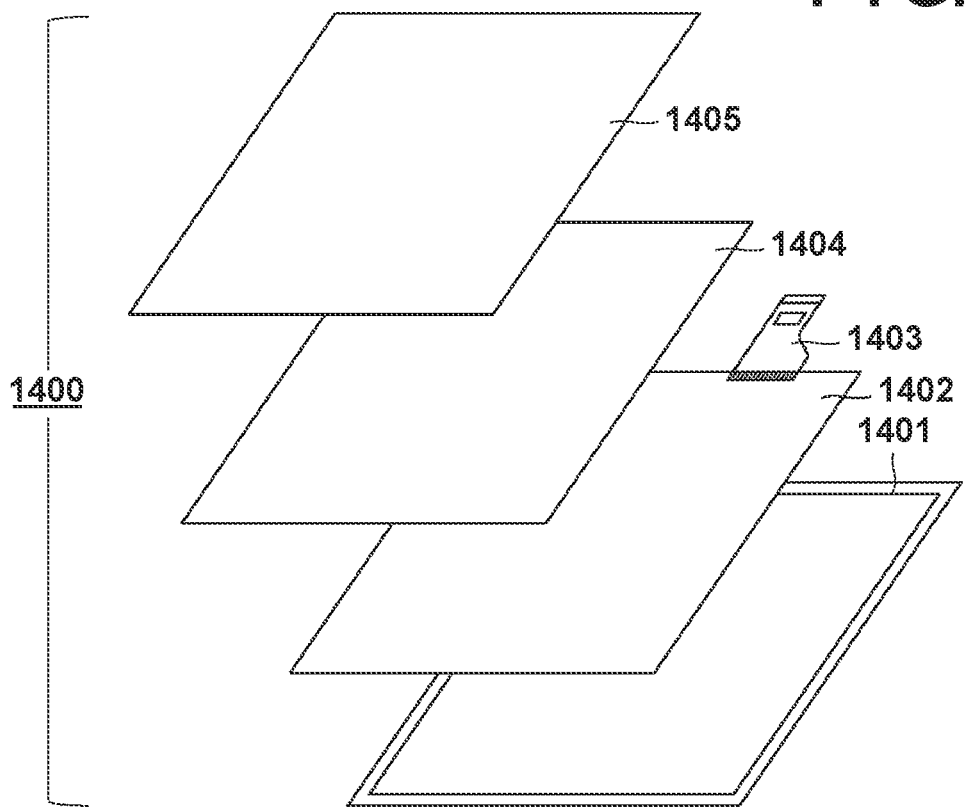
FIG. 24A is a view schematically showing an example of an illumination device using the display device.

FIG. 24A is a view schematically showing an example of an illumination device using the characteristics of the display device of the present invention. An illumination device 1400 may include a housing 1401, a light source 1402, a circuit board 1403, an optical film 1404, and a light diffusion unit 1405. The light source may be the display device including the organic light-emitting element according to the present invention. The optical filter may be a filter that improves the color rendering property of the light source. The light diffusion unit can effectively diffuse light from the light source to illuminate a wide range for lighting up or the like. The optical filter and the light diffusion unit may be provided on the illumination light emission side. A cover may be provided in the outermost portion, as needed. Thus, in this specification, the display device is not limited to a device that displays an image, but includes a device that includes a plurality of light-emitting elements and is used as a light source.

An illumination device is, for example, a device that illuminates a room. The illumination device may emit light of white light, neutral white color, or any other color from blue to red. A light control circuit for controlling the light color may be provided. The illumination device may include the display device according to the present invention and a power supply circuit connected thereto. The power supply circuit is a circuit that converts an AC voltage into a DC voltage. Note that white light has a color temperature of 4200K, and neutral white color has a color temperature of 5000K. The illumination device may include a color filter.

Further, the illumination device according to this embodiment may include a heat dissipation member. The heat dissipation member releases the heat in the device to the outside of the device, and examples thereof include a metal having high specific heat, liquid silicon, and the like.

Figure 24B:
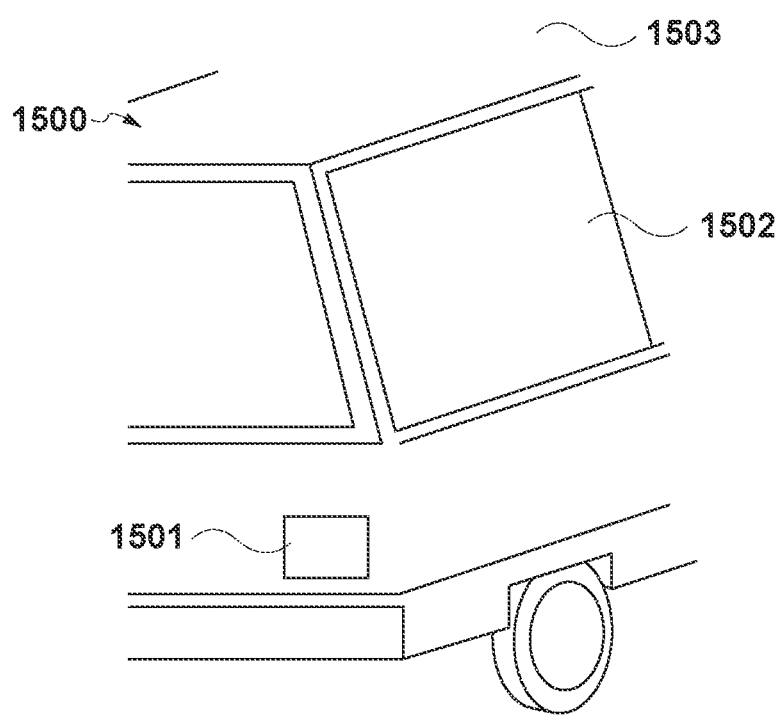
FIG. 24B is a view showing a vehicle lighting unit using the display device.

FIG. 24B is a view schematically showing an automobile which is an example of a mobile body using the display device of the present invention as a lighting unit. The automobile includes a tail lamp which is an example of the lighting unit. An automobile 1500 includes a tail lamp 1501, and may turn on the tail lamp when a brake operation or the like is performed.

The tail lamp 1501 may be the display device including the organic light-emitting element according to the present invention. The tail lamp may include a protective member that protects the display device. The protective member has a certain degree of strength, and can be made from any material as long as it is transparent, but can be made from polycarbonate or the like. Furandicarboxylic acid derivative, acrylonitrile derivative, or the like may be mixed with polycarbonate.

The automobile 1500 may include a body 1503 and windows 1502 attached thereto. The window may be a transparent display as long as it is not a window for checking the front or rear of the automobile. The transparent display may include the organic light-emitting element according to this embodiment. In this case, the components such as the electrodes included in the organic light-emitting element are formed by transparent members.

The moving body according to this embodiment may be a ship, an aircraft, a drone, or the like. The moving body may include a body and a lighting unit provided in the body. The lighting unit may emit light to inform the position of the body. The lighting unit includes the organic light-emitting element according to this embodiment.

As described above, by using the device using the organic light-emitting element according to this embodiment, it is possible to perform stable display even for a long-time display with good image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-209928, filed Nov. 7, 2018, and Japanese Patent Application No. 2019-186265, filed Oct. 9, 2019, which are hereby incorporated by reference herein in their entirety.

What is claimed is:

1. A display device comprising:
a pixel area in which a plurality of pixels are arrange; and
a dummy pixel area which is provided around the pixel area and in which a plurality of dummy pixels are arranged,
wherein each of the pixel and the dummy pixel includes (a) a light-emitting element including a first electrode and a second electrode, and (b) a driving transistor,
wherein the first electrode of the light-emitting element is connected to the driving transistor in the pixel,
wherein in the dummy pixel, (a) the light-emitting element is not connected to the driving transistor, (b) a first potential is supplied to the first electrode, (c) a second potential is supplied to the second electrode, and (d) the light-emitting element does not emit light at a potential difference between the first potential and the second potential, and wherein the first electrode and the second electrode of the light-emitting element are connected to each other in the dummy pixel.

2. The device according to claim 1, wherein the first electrode and the second electrode are connected to each other in the dummy pixel using a contact hole.

3. The device according to claim 1, wherein in the pixel, the first electrode serves as an anode, and the second electrode serves as a cathode, and wherein the first electrode and the second electrode of the light-emitting element in the dummy pixel correspond to the first electrode and the second electrode of the pixel, respectively.

4. The device according to claim 1, wherein at least one of a source and a drain of the driving transistor of the dummy pixel is connected to a back gate of the driving transistor.

5. The device according to claim 1, wherein each of the pixel and the dummy pixel further includes:

a writing transistor configured to apply a signal voltage to a capacitive element connected to a gate of the driving transistor; and a light emission control transistor configured to control conduction/non-conduction of a current flowing to the light-emitting element, and wherein a predetermined potential is applied to a back gate of each of the driving transistor, the writing transistor, and the light emission control transistor of the dummy pixel.

6. The device according to claim 5, wherein a source and a drain of the driving transistor of the dummy pixel are connected to the back gate of the driving transistor, and wherein at least one of a source and a drain of the writing transistor is connected to the back gate of the writing transistor.

7. The device according to claim 1, wherein each of the pixel and the dummy pixel further includes a reset transistor, wherein the reset transistor is connected to the light-emitting element in the pixel, and wherein the reset transistor is not connected to the light-emitting element in the dummy pixel.

8. The device according to claim 7, wherein one of a source and a drain of the reset transistor of the dummy pixel is connected to the driving transistor, and wherein a reference potential is applied to the other of the source and the drain.

9. The device according to claim 7, wherein at least one of a source and a drain of the reset transistor of the dummy pixel is connected to a back gate of the reset transistor of the dummy pixel.

10. The device according to claim 7, wherein a predetermined potential is applied to a back gate of the reset transistor of the dummy pixel.

11. The device according to claim 7, wherein the reset transistor of the pixel is controlled to be conductive while the light-emitting element is controlled not to emit light.

12. The device according to claim 1, further comprising:

a scanning line configured to drive the pixels arranged in a row; and a signal line configured to supply a signal to the pixels arranged in a column, wherein the dummy pixel area includes a first dummy pixel area and a second dummy pixel area, wherein the scanning line is arranged so as to pass through the first dummy pixel area, and wherein the signal line is arranged so as to pass through the second dummy pixel area.

13. The device according to claim 12, wherein a gate of the transistor of the dummy pixel in the first dummy pixel area is connected to the scanning line, and wherein a gate of the transistor of the dummy pixel in the second dummy pixel area is connected to a predetermined potential.

14. The device according to claim 12, wherein a back gate of a writing transistor of the dummy pixel in the first dummy pixel area is not connected to the signal line, and wherein a back gate of a writing transistor of the dummy pixel in the second dummy pixel area is connected to the signal line.

15. An image capturing device comprising:

an optical unit including a plurality of lenses;

an image sensor configured to receive light passing through the optical unit; and a display unit configured to display an image formed by the image sensor, wherein the display unit includes a display device according to claim 1.

16. An electronic apparatus comprising:

a display unit including a display device according to claim 1;

a housing provided with the display unit; and a communication unit provided in the housing and configured to communicate with the outside.

17. An illumination device comprising:

a light source including a display device according to claim 1; and one of a light diffusion unit and an optical film configured to transmit light emitted by the light source.

18. A mobile body comprising:

a lighting unit including a display device according to claim 1; and a body provided with the lighting unit.

19. The device according to claim 1, wherein the first potential is different from a potential supplied to the first electrode of the light-emitting element of the pixel.

* * * * *